US009652879B2

(12) United States Patent
Aguado

(10) Patent No.: US 9,652,879 B2
(45) Date of Patent: May 16, 2017

(54) ANIMATION OF A VIRTUAL OBJECT

(71) Applicant: NaturalMotion Limited, Oxford (GB)

(72) Inventor: Alberto Aguado, Oxford (GB)

(73) Assignee: NaturalMotion Ltd., Oxford (GB)

( * ) Notice: Subject to any disclaimer, the term of this patent is extended or adjusted under 35 U.S.C. 154(b) by 518 days.

(21) Appl. No.: 14/224,407

(22) Filed: Mar. 25, 2014

(65) Prior Publication Data

US 2014/0285513 A1 Sep. 25, 2014

(51) Int. Cl.
*G06T 13/00* (2011.01)
*G06T 13/40* (2011.01)

(52) U.S. Cl.
CPC .............. *G06T 13/00* (2013.01); *G06T 13/40* (2013.01)

(58) Field of Classification Search
CPC ....... G06T 3/4007; G06T 13/00; G06T 13/20; G06T 13/80; H04N 7/0135; H04N 19/132; H04N 21/4312
USPC ......................................................... 345/620
See application file for complete search history.

(56) References Cited

U.S. PATENT DOCUMENTS

| 6,856,319 | B2 | 2/2005 | Rose, III et al. | |
|---|---|---|---|---|
| 7,391,420 | B1* | 6/2008 | Coyne | G06T 13/00 345/473 |
| 8,456,476 | B1* | 6/2013 | Kovar | G06T 13/40 345/474 |
| 8,614,714 | B1* | 12/2013 | Koperwas | G06T 13/20 345/473 |
| 8,957,915 | B1* | 2/2015 | Chalasani | G09G 5/377 345/473 |
| 9,123,175 | B1* | 9/2015 | Goldenthal | G06T 13/40 |
| 2001/0019333 | A1* | 9/2001 | Sasaki | A63F 13/10 345/653 |
| 2004/0012594 | A1* | 1/2004 | Gauthier | G06T 13/40 345/473 |

(Continued)

FOREIGN PATENT DOCUMENTS

JP 2007-167323 A 7/2007

OTHER PUBLICATIONS

Combined Search and Examination Report under Sections 17 and 18(3), dated Sep. 20, 2013, 7 pages.

*Primary Examiner* — Daniel F Hajnik
*Assistant Examiner* — Sae Won Yoon
(74) *Attorney, Agent, or Firm* — Schwegman Lundberg & Woessner, P.A.

(57) ABSTRACT

A target animation includes a blend of two or more animations from a plurality of predetermined animations. The blend includes a weighted combination of the two or more animations based on respective blend weights. In a method of generating a target animation of a virtual object, an input identifying a first point, specifying the target animation, in a control parameter space is received. A second point corresponding to the first point is determined using a predetermined displacement function. A barycentric coordinate for the second point in the control parameter space is determined. The barycentric coordinate is defined relative to predetermined points in the control parameter space, each predetermined point corresponding either to a respective one of the two or more animations or a respective blend of the two or more animations. The blend weights for the two or more animations are based on the barycentric coordinate for the second point.

30 Claims, 15 Drawing Sheets

(56) References Cited

U.S. PATENT DOCUMENTS

| | | | |
|---|---|---|---|
| 2004/0227761 A1* | 11/2004 | Anderson | G06T 13/40 345/473 |
| 2004/0263518 A1* | 12/2004 | Anderson | G06T 13/40 345/473 |
| 2007/0291050 A1* | 12/2007 | Bruderlin | G06T 13/40 345/606 |
| 2009/0179900 A1* | 7/2009 | Petrovic | G06T 13/40 345/473 |
| 2009/0195544 A1 | 8/2009 | Wrinch | |
| 2009/0262118 A1* | 10/2009 | Arikan | G06T 13/40 345/473 |
| 2010/0091018 A1* | 4/2010 | Tatarchuk | G06T 13/20 345/423 |

* cited by examiner

ANIMATION OF A VIRTUAL OBJECT

CROSS-REFERENCE TO RELATED APPLICATION

This Application claims priority to United Kingdom Application No. 1305384.8, filed on Mar. 25, 2013, in English. The content of which is hereby incorporated by reference in its entirety.

FIELD OF THE INVENTION

The present invention relates to a method of generating a target animation of a virtual object and a method of enabling generation of a target animation of a virtual object, and apparatus and computer programs for carrying out such methods.

BACKGROUND OF THE INVENTION

It is known to generate an animation for one or more virtual objects (also termed "characters") that are located in a virtual environment, such as a three dimensional virtual environment of a video game or visual effects tool.

For a virtual object, there may be a large number of actions or motions that may need to be represented as an animation of that virtual object. For example, a virtual object representing a human character may be animated so that the character walks, runs, hops, jumps, limps, skips, kneels down, falls down, crawls, looks or points in a particular direction, etc. An animation may be authored or created and data representing or defining the animation may then be stored so that the virtual object can be made to perform that action by animating the virtual object using the animation data when desired. Animation data may created, for example, by "key framing" or "motion capture": in "key framing", the animation is defined by collecting data representing the configuration of the virtual object at different points in time (key frames) and then interpolating between positions of the virtual object in successive key frames; in "motion capture", animation data is obtained from sensors attached to a human actor. However, if these approaches were taken for every conceivable action that the virtual object may perform (or for those actions that one may wish the virtual object to be able to perform at some stage), then this would lead to an unfeasibly large number of animations being created and an immense amount of data being stored. For example, for the human character to be able to run at different speeds, the above approach would require an animation to be created and animation data stored for each desired speed.

Moreover, using such "canned" animation data is often unsatisfactory (e.g. they do not provide for sufficiently realistic, responsive or precise animations) for interactive applications such as video games and virtual reality simulations, i.e. applications in which a user has the choice to change the how the virtual object is being animated to perform character actions or goal-based commands, such as running at different speeds or in different directions.

Consequently, the approach normally taken is to have a smaller number of predetermined animations for a virtual object, and to store corresponding animation data for those predetermined animations. Two or more of these predetermined animations may then be blended (or mixed or combined) to form other animations for the virtual object. In particular, blend weights, or blending parameters, may be associated with the predetermined animations to represent how much those predetermined animations contribute to the final animation the final animation may then be created using the predetermined animations blended according to the blend weights. For example, the human character may have an associated predetermined "walk" animation and an associated predetermined "run" animation, in which case the human character may be made to jog by blending the walk animation and the run animation with blend weights of $(1-\alpha)$ and a respectively for some value $0<\alpha<1$, where larger values of a correspond to faster jogs.

An animation engine is the component or system or module that performs the animation of the virtual object. An animation engines may provide direct control of the blend weights (i.e. it may provide or expose an interface via which the animation engine may receive desired blend weights from another component or module). However, the use of animation blending, especially in interactive applications, normally involves the use of alternative values with a more intuitive meaning (control parameters) than blend weights. For example, in an interactive application the user may control the virtual object by using control parameters that are then transformed into blend weights by the animation engine. For example, when animating a human character, the animation engine may have an interface for controlling the speed of the virtual object, for example by receiving an input the specifies a desired speed in a particular unit, such as meters per second. Thus, for example, instead of providing the animation engine with the blend weights $(1-\alpha)$ and $\alpha$ for blending a "walk" animation and a "run" animation to generate a "jog" animation, the animation engine may be arranged to receive an input that specifies the actual speed for the jog. Such parameters or attributes of the animation that the animation engine is arranged to receive as its inputs are called control parameters. The animation engine may then convert one or more control parameters that it receives into blend weights for use in blending predetermined animations to generate an output animation.

In view of the foregoing, there is a need for an efficient system that computes, from respective values for a set of control parameters, corresponding values for the set of blend weights. In general, it is not possible to store, for all possible combinations of values for the set of control parameters, the corresponding values for the set of blend weights, since that would require an impractical amount of memory for most applications. To be practical, it is necessary to use only a small number of samples (or examples), where each sample indicates of how to map a particular group of values for the set of control parameters to corresponding values for the set of blend weights. However, this inherently produces lack of accuracy in the blending process that results when performing blending based on values for the set control parameters that are not represented exactly by one of the samples. Whilst accuracy can be increased by adding more samples, this makes the system less efficient since more memory is used and there is an increase in the number of computations required to process the larger number of samples.

Moreover, the conversion of control parameters to blend weights does not always result in an output animation of the virtual object that achieves the desired effect. For example, if a control parameter specifies that the human character should jog at 5 m/s, this may be converted into one or more blend weights which, when used in the actual blending of the predetermined "walk" and "run" animations, results in an output animation that actually achieves a jog speed other than 5 m/s, say 5.3 m/s. This may be due to how the blend weights are computed from the control parameters and/or how the blending is performed once the blend weights have been calculated, or due to other factors.

Consequently, there is a need for a more efficient technique that overcomes the drawbacks of using limited samples to compute blend weights from control parameters. It would also be desirable to have better control over the animations that the animation engine produces.

SUMMARY OF THE INVENTION

According to a first aspect of the invention, there is provided a method of generating a target animation of a virtual object, the target animation comprising a blend of two or more animations from a plurality of predetermined animations, the blend comprising a weighted combination of the two or more animations based on respective blend weights for the two or more animations, the method comprising: receiving an input identifying a first point, specifying the target animation, in a control parameter space, wherein there are one or more predetermined properties for animations of the virtual object and where each point in the control parameter space defines a corresponding value for each of the one or more predetermined properties; using a predetermined displacement function to determine, based on the first point, a corresponding second point in the control parameter space; and determining a barycentric coordinate for the second point in the control parameter space, the barycentric coordinate being defined relative to predetermined points in the control parameter space, each predetermined point corresponding either to a respective one of the two or more animations or a respective blend of the two or more animations, wherein the blend weights for the two or more animations are based on the second barycentric coordinate.

The method may comprise: determining a barycentric coordinate for the first point, the first barycentric coordinate being defined relative to the predetermined points in the control parameter space; wherein said predetermined displacement function determines the second point using the barycentric coordinate of the first point.

The displacement function may correspond to a displacement field or a vector field.

The predetermined displacement function may be arranged to receive data identifying the first point and to output a displacement corresponding to the first point, wherein said second point is the first point displaced by the displacement.

The predetermined function may be arranged such that an animation of the virtual object using blend weights for the two or more animations that are based on a barycentric coordinate of the second point defined relative to the predetermined points would correspond to a point in the control parameter space that is substantially the same as the first point. In such cases, it is likely that an animation of the virtual object using blend weights for the two or more animations that are based on a barycentric coordinate of the first point defined relative to the predetermined points would correspond to a point in the control parameter space that is substantially different from the first point.

The blend of the two or more animations may be performed according to a blending process that is arranged to blend animations using blend weights based on a barycentric coordinate of a point in the control parameter space, wherein the determined second point compensates for non-linearities introduced by the blending processing.

The method may comprise identifying the two or more animations from the plurality of predetermined animations based on the first point.

In some embodiments, there are one or more predetermined groupings of the predetermined points in the control parameter space; each grouping corresponds to a respective portion of the control parameter space defined by the respective predetermined points in the control parameter space; and identifying the two or more animations comprises identifying a grouping whose respective portion contains the first point.

In some embodiments, there are one or more predetermined groupings of the predetermined points in the control parameter space; each grouping corresponds to a respective portion of the control parameter space defined by the respective predetermined points in the control parameter space; the first point lies outside of the portions of the control parameter space; identifying the two or more animations comprises identifying a grouping whose respective portion is closest to the first point; the method comprises projecting the first point onto a surface of the portion corresponding to the identified grouping, said projecting identifying a projected point on the portion corresponding to the identified grouping; and the second point is a point on the surface of the portion corresponding to the identified grouping and is determined based on the projected point. Projecting the first point onto the surface of portion corresponding to the identified grouping may comprise linearly projecting the first point towards one of the predetermined points in the control parameter space of the identified grouping.

In some embodiments, for each predetermined grouping there are one or more corresponding predetermined displacement functions; and the displacement function used to determine the second point is a predetermined displacement function associated with the identified grouping. The displacement function used to determine the second point may be selected based on the predetermined point towards which the first point is projected.

According to an aspect of the invention, there is provided a method of enabling generation of a target animation of a virtual object, the target animation comprising a blend of two or more animations from a plurality of predetermined animations, the blend comprising a weighted combination of the two or more animations based on respective blend weights for the two or more animations, wherein generation of the target animation comprises determining the blend weights based on a point in a control parameter space, wherein there are one or more predetermined properties for animations of the virtual object and where each point in the control parameter space defines a corresponding value for each of the one or more predetermined properties, the method comprising: generating a displacement function for use in a method according to any one of the preceding claims; and configuring an animation engine to use the generated displacement function, the use of the generated displacement function comprising carrying out a method according to any one of the preceding claims.

The method may comprise: for each of a plurality of test points in the control parameter space: animating the virtual object by blending the two or more animations using respective blend weights, the respective blend weights being based on a barycentric coordinate of the test point defined relative to predetermined points in the control parameter space, each predetermined point corresponding either to a respective one of the two or more animations or a respective blend of the two or more animations; and identifying a corresponding result point in the control parameter space that represents the animation of the virtual object that results from said animating; using the test points and the corresponding result points to determine the displacement function.

According to an aspect of the invention, there is provided an apparatus comprising a processor, the processor arranged to carry out any one of the above-described methods.

According to an aspect of the invention, there is provided a computer program which, when executed by a processor, causes the processor to carry out any one of the above-described methods. The computer program may be stored on a computer readable medium.

BRIEF DESCRIPTION OF THE DRAWINGS

Embodiments of the invention will now be described, by way of example only, with reference to the accompanying drawings, in which.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

1—System Overview

Figure 1:
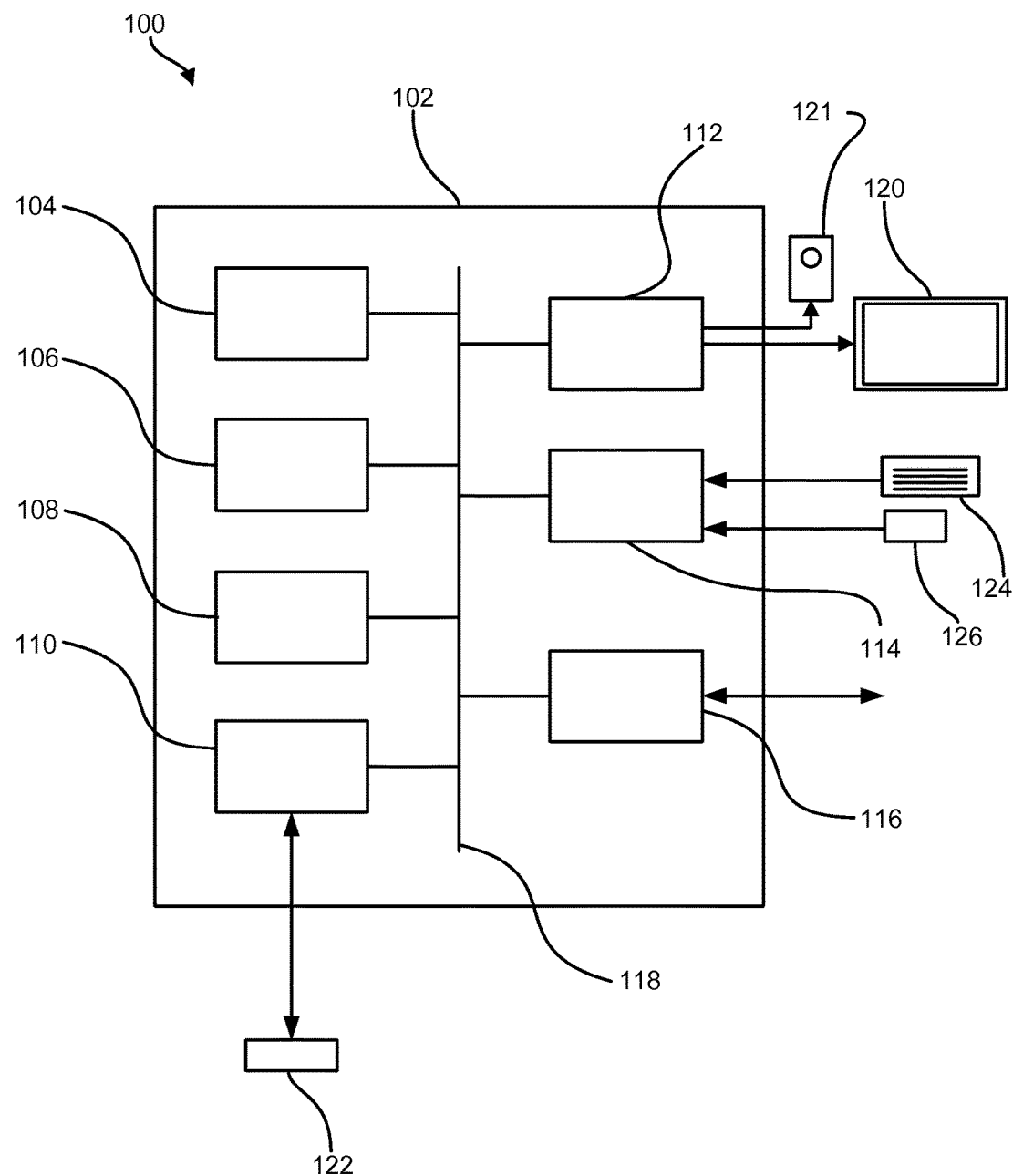
FIG. 1 schematically illustrates an example of a computer system according to an embodiment of the invention.

FIG. 1 schematically illustrates an example of a computer system 100. The system 100 comprises a computer 102. The computer 102 comprises: a storage medium 104, a memory 106, a processor 108, an interface 110, a user output interface 112, a user input interface 114 and a network interface 116, which are all linked together over one or more communication buses 118.

The storage medium 104 may be any form of non-volatile data storage device such as one or more of a hard disk drive, a magnetic disc, an optical disc, a ROM, etc. The storage medium 104 may store an operating system for the processor 108 to execute in order for the computer 102 to function. The storage medium 104 may also store one or more computer programs (or software or instructions or code).

The memory 106 may be any random access memory (storage unit or volatile storage medium) suitable for storing data and/or computer programs (or software or instructions or code).

The processor 108 may be any data processing unit suitable for executing one or more computer programs (such as those stored on the storage medium 104 and/or in the memory 106), some of which may be computer programs according to embodiments of the invention or computer programs that, when executed by the processor 108, cause the processor 108 to carry out a method according to an embodiment of the invention and configure the system 100 to be a system according to an embodiment of the invention. The processor 108 may comprise a single data processing unit or multiple data processing units operating in parallel or in cooperation with each other. The processor 108, in carrying out data processing operations for embodiments of the invention, may store data to and/or read data from the storage medium 104 and/or the memory 106.

The interface 110 may be any unit for providing an interface to a device 122 external to, or removable from, the computer 102. The device 122 may be a data storage device, for example, one or more of an optical disc, a magnetic disc, a solid-state-storage device, etc. The device 122 may have processing capabilities—for example, the device may be a smart card. The interface 110 may therefore access data from, or provide data to, or interface with, the device 122 in accordance with one or more commands that it receives from the processor 108.

The user input interface 114 is arranged to receive input from a user, or operator, of the system 100. The user may provide this input via one or more input devices of the system 100, such as a mouse (or other pointing device) 126 and/or a keyboard 124, that are connected to, or in communication with, the user input interface 114. However, it will be appreciated that the user may provide input to the computer 102 via one or more additional or alternative input devices (such as a touch screen). The computer 102 may store the input received from the input devices via the user input interface 114 in the memory 106 for the processor 108 to subsequently access and process, or may pass it straight to the processor 108, so that the processor 108 can respond to the user input accordingly.

The user output interface 112 is arranged to provide a graphical/visual and/or audio output to a user, or operator, of the system 100. As such, the processor 108 may be arranged to instruct the user output interface 112 to form an image/video signal representing a desired graphical output, and to provide this signal to a monitor (or screen or display unit) 120 of the system 100 that is connected to the user output interface 112. Additionally or alternatively, the processor 108 may be arranged to instruct the user output interface 112 to form an audio signal representing a desired audio output, and to provide this signal to one or more speakers 121 of the system 100 that is connected to the user output interface 112.

Finally, the network interface 116 provides functionality for the computer 102 to download data from and/or upload data to one or more data communication networks.

It will be appreciated that the architecture of the system 100 illustrated in FIG. 1 and described above is merely exemplary and that other computer systems 100 with different architectures (for example with fewer components than shown in FIG. 1 or with additional and/or alternative components than shown in FIG. 1) may be used in embodiments of the invention. As examples, the computer system 100 could comprise one or more of: a personal computer; a server computer; a mobile telephone; a tablet; a laptop; a television set; a set top box; a games console; other mobile devices or consumer electronics devices; etc.

2—Animations and Data for Animations

Figure 2:
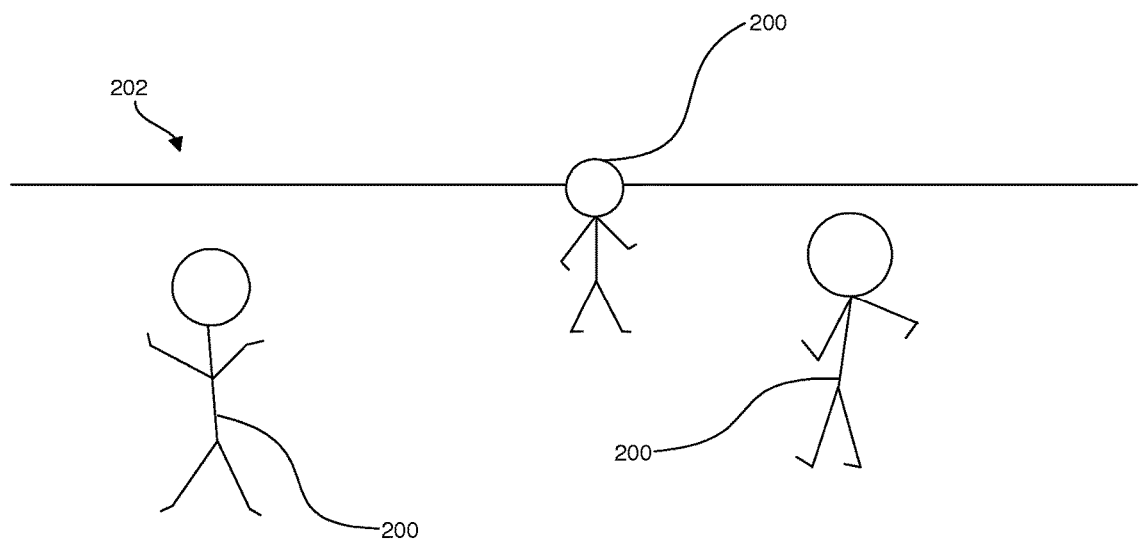
FIG. 2 schematically illustrates three example virtual objects within a virtual world.

Embodiments of the invention are concerned with animations and, in particular, an animation of a virtual object (or a character) that is located (or resides) within a virtual world (or environment). FIG. 2 schematically illustrates three example virtual objects 200 within a virtual world 202. The virtual objects 200 shown in FIG. 2 (and the rest of this application) represent human beings, but it will be appreciated that embodiments of the invention are equally applicable to animations of virtual objects that represent other articles, items, animals, etc. and other types, structures and forms of object that have different intended representations. The virtual world 202 may be any virtual environment, arena or space containing the virtual objects 200 and in which the virtual objects 200 may be moved or animated. Thus, the virtual world 202 may represent a real-world location, a fictitious location, a building, the outdoors, underwater, in the sky, a scenario/location in a game or in a movie, etc. The animation of the virtual object 200 may form a part of a computer game being executed by the processor 108 of the computer system 100, with the animation being generated/computed in real-time. The animation of the virtual object 200 may be generated/computed so as to output a video animation to form part of a film/movie (in which case the generation/computation need not be in real-time). The animation of the virtual object 200 may be generated/computed for other purposes (e.g. computer simulations that involve objects moving and interacting in an environment).

An animation for an object 200 comprises performing an update process at each time point (also referred to as an animation update step) in a series of time points (or a series of animation update steps or update time points). These time-points may correspond to video frames, video fields, or any other time or display frequency of interest for the rest of this description, the time-points shall be assumed to correspond—to video frames, but it will be appreciated that this is only an example and should not be taken as limiting. For example, in some embodiments, one or more animation update steps may be carried out between successive video frames/fields and this number may or may not be constant over time. It will be appreciated that the display frequency (i.e. the frequency at which a display process displays or renders an image of the virtual world 202) need not necessarily be linked to the frequency of performing the update process. The update process performed at the animation update step updates values for attributes of (or associated with) the object 200. These attributes may correspond to, for example, the location and/or orientation of one or more object parts of the object 200 (e.g. the location and/or orientation of the limbs, neck, digits, head, etc. of a human object 200). Thus, in updating the values for the location and/or orientation object attributes, the object 200 is moved within the virtual world 202. However, the attributes associated with the object 200 are not limited to location and/or orientation object attributes, as discussed below.

In the embodiments described below, the animations relate to so-called "skeletal animation", but it will be appreciated that different types or styles of animation fall within the scope of the present invention. The object attributes for an object 200 may be represented by some or all of the following data (depending on the type of animation and how the object 200 and its attributes are to be represented): (a) topological data; (b) geometric data; (c) physical data; (d) trajectory data; (e) skinning data; and (f) rendering data. These data are described in more detail below. It will be appreciated that the object 200 may have attributes in addition to, or as alternatives to, the attributes as described further below with reference to the various data (a)-(f).

Figure 3:
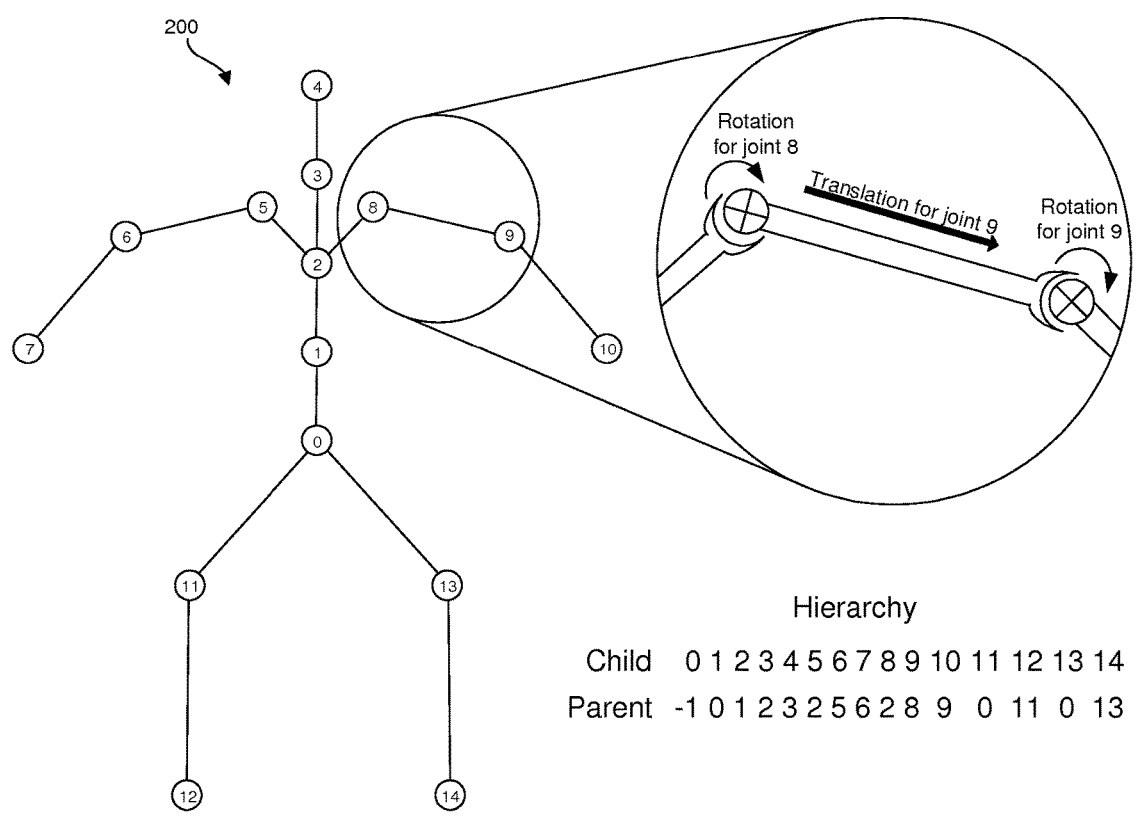
FIG. 3 schematically illustrates an object for an animation according to an embodiment of the invention.

FIG. 3 schematically illustrates an object 200 for an animation according to an embodiment of the invention. The object 200 comprises a plurality of object sections (or "bones") linked together by respective joints. In FIG. 3, the sections of the object 200 are the straight lines whilst the joints of the object 200 are the numbered circles.

In general, a joint is a (simulated) point or surface or location of contact between two or more object sections so that that joint links (or creates an association between) those sections. In other words, such a joint forms a simulated connection or tie between object sections (in the same way that, for example, a forearm is connected to an upper arm by virtue of an elbow joint). In this way, an object section may have one or more joints associated with it. A joint normally occurs at an end of the object section(s) it is associated with.

Some joints (such as joint 10 in FIG. 3) occur at the end of an object section, but do not link that section to another section. These joints merely serve to indicate the location of the free (i.e. unconnected) end of that section.

In some embodiments, each object section is "rigid" in that the distance between the joints associated with that section is constant, although, of course, each rigid section may have its own length/distance which may be different from the length/distance for the other rigid sections. However, it will be appreciated that in other embodiments one or more of the sections of the object 200 may not be "rigid".

The object 200 may therefore be considered to comprise a plurality of object parts. In some embodiments, the topological data represents the object 200 as a plurality of joints (i.e. the object parts are just the joints). In some embodiments, the topological data represents the object 200 as a plurality of object sections (i.e. the object parts are just the bones). In some embodiments, the topological data represents the object 200 as a plurality of joints together with a plurality of object sections. The actual representation does not matter for embodiments of the invention and therefore in this description the topological data shall represent the object 200 as a plurality of joints and it will be appreciated that the use herein of the term "joint" encompasses both joints and/or bones unless stated otherwise or unless clearly not appropriate. However, the skilled person will appreciate that the following description may be applied analogously to the alternative styles of representation.

The object parts may be considered as forming a skeleton, or framework, for the object 200.

The object parts (joints in this representation) are linked together, or are associated with each other, in a hierarchy. The hierarchy of joints illustrated in FIG. 3 may be represented by table 1 below:

TABLE 1

| Joint ID | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Parent ID | -1 | 0 | 1 | 2 | 3 | 2 | 5 | 6 | 2 | 8 | 9 | 0 | 11 | 0 | 13 |

In this hierarchy of joints for the object 200, each joint, other than a central, basis root joint (labelled with a joint ID of 0) is a child of another joint in the hierarchy, i.e. every joint other than that root joint is associated with (or linked to) a second joint in the hierarchy (by virtue of a connecting object section), where that second joint is considered to be the parent of that joint. The fact that the central joint is not a child of another joint (and therefore has no parent joint) is represented in table 1 by indicating a parent ID of −1. For example, joint 2 is a child of joint 1 and itself has three children, namely joints 3, 5 and 8. As another example, joint 10 is a child of joint 9, but has no children itself. A joint such as joint 10 that has no child joints (i.e. a joint that is not itself a parent) is included so as to represent a "terminating end" of a section of the object 200, i.e. to indicate the location of the extremities of the object 200. Due to the connecting nature of the object sections that link joints, the movement, position and orientation of a joint in the virtual world 202 is affected by the movement, position and orientation of the parent of that joint in the virtual world 202.

Figure 4:
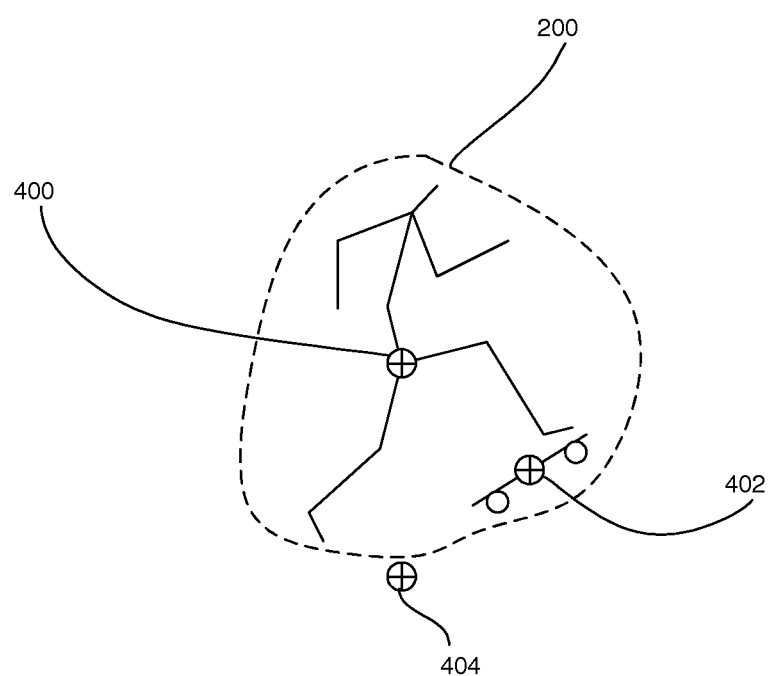
FIG. 4 schematically illustrates a compound object.

An object may have multiple root joints. For example, FIG. 4 schematically illustrates a compound object 200 representing a person on a skateboard. This may be considered as being one object as the person and the skateboard may be considered to be one set of semantically linked data (i.e. a single character). However, as the person and the skateboard are not rigidly or permanently attached to each other, they each have their own root joints, namely a root joint 400 for the person and a root joint 402 for the skateboard. The joints for the person will then be hierarchically related to the root joint 400, whilst the joints for the skateboard will be hierarchically related to the root joint 402.

The topological data for the object 200 is data that represents this hierarchy (or hierarchies) or structure of the object parts, i.e. data defining the parent-child relationships between the various object parts that make up the object 200. For example, the topological data for the object 200 may be stored in the form of table 1 above.

The geometric data for the object 200 represents the relative positions and orientations of the object parts. The values given to the geometric data represent the positioning or configuration of the object 200 in a particular posture or stature. In effect, the attributes for the object 200 represented by the geometric data are the length of each object section (bone) together with that bone's orientation relative to its parent bone, i.e. this geometric data represents the distance between a joint and its parent joint, together with the orientation of that joint relative to the parent joint. There are many well-known ways of representing this geometric data, such as: (a) using respective transformation matrices for the joints; (b) using respective pairs of 3×3 rotation matrices and 1×3 translation matrices; or (c) using respective quaternions. As these methods are well-known, and as the particular method used is not important for embodiments of the invention, these methods shall not be described in more detail herein. An example representing some of the geometric data for joints 8 and 9 is shown in FIG. 3.

The geometric data for a particular joint is normally defined in a coordinate space local to the parent of that joint (i.e. in which that parent is fixed). Thus, for example, if a "shoulder joint" 8 of FIG. 3 moves but the "elbow joint" 9 of FIG. 3 does not move relative to the shoulder joint, then the geometric data 308 for the elbow joint would not change.

The attribute of the object 200 represented by the trajectory data is the location and orientation in the virtual world 202 of a so-called "trajectory joint" 404 for the object 200 (shown in FIG. 4 but not shown in FIG. 3). The trajectory joint 404 is used as a representative location of the object 200 within the world 202. Thus, different values for the trajectory data place the trajectory joint 404 (and hence the object 200) at different locations in the virtual world 202.

The trajectory joint 404 is usually not an actual joint of the object 200 (i.e. it need not form part of the structure of the object 200), but is simply a position and orientation within the virtual world 202 to represent the overall location and orientation for the object 200. For convenience, the trajectory joint 404 may be represented as a "special" joint within the hierarchy represented by the topological data. The trajectory joint 404 need not be a root joint (with no parent) but can be located anywhere within the skeleton topology as represented by the topological data. However, it is generally the location and orientation of the joints of the object 200 (as specified by virtue of the topological data and the geometric data) relative to the trajectory joint 404 that is important as this results in a particular joint or object section being at a particular/absolute position and orientation within the entire virtual world 202. One way of viewing or implementing this is for all joints of the object 200 (as specified by the topological data), including root joints, to be ultimately parented to the trajectory joint 404 so that their location and orientation within the virtual world 202 can be calculated based on the trajectory data, the topological data and the geometric data.

The orientation of a trajectory joint 404 is just as important as its position, as it represents the overall direction that the object 200 is "facing".

Figure 5:
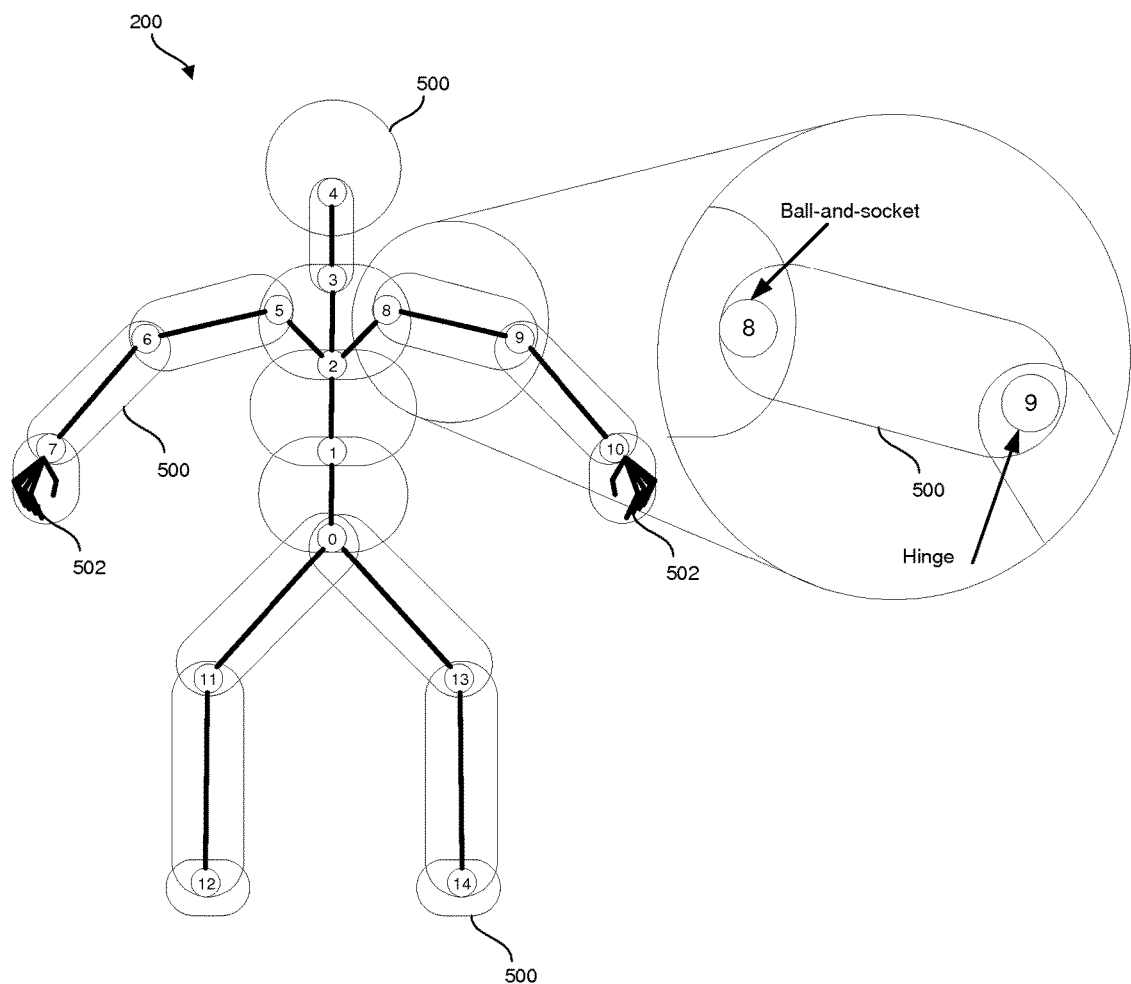
FIG. 5 schematically illustrates regions for the joints for an object.

The physical data represents various physical attributes for the object 200. These physical attributes represent or impose various physical properties or restrictions or limitations on the object 200. Typically, subsets of the physical data are associated with respective joints represented by the topological data. For example, one or more of the joints (or bones) represented by the topological data may have corresponding physical data representing attributes such as:

Size and shape of a region around that joint. The region may be a capsule or a cylinder, with the size and shape being defined by lengths and radii accordingly. The region may represent the body, or the "bulk", of the object 200 that is supported by the framework of bones and joints. If another object 200 were to enter, penetrate or perhaps even just contact this region, then the two objects 200 may be considered to have collided. FIG. 5 schematically illustrates such regions 500 for the joints for the object 200.

A mass for the joint.

An inertia property for the joint.

Other properties of the joint such as stiffness, damping factors, type of joint. For example, the "shoulder" joint 8 in FIG. 5 may be a ball-and-socket joint whilst the "elbow" joint 9 in FIG. 5 may be a hinge joint. Such data may therefore restrict or constrain how one joint may move (e.g. hinge or rotate or pivot) with respect to another joint (a parent or a child joint).

However, as shown in FIG. 5, some of the joints 502 represented by the topological data may not have corresponding physical attributes.

The skinning data is data that enables so-called "skinning" for the animation. The process of skinning is well-known in this field of technology and shall not be described in more detail herein—it takes a definition of the surface of the object 200 and attaches it to the skeleton formed by the object parts (the joints and/or bones). The skinning data is therefore data defining this object surface, which is an attribute of the object 200.

The rendering data is data that enables so-called "rendering" of the animation. The process of rendering is well-known in this field of technology and shall not be described in more detail herein—it actually outputs or displays the skinned surface with relevant textures, colours, lighting, etc. as appropriate. The rendering data is therefore data defining the textures, colours, lighting, etc., which are attributes of the object 200.

It will be appreciated that embodiments of the invention may use some or all of the above types of data in relation to objects 200, and may also use additional different types of data for objects 200.

For each of the objects 200, there may be one or more associated animations for that object 200. An animation of an object 200 represents how that object 200 (or the sections or joints of that object 200) are to move. In particular, an animation of an object may be defined by animation data from which the geometric data for the object 200 and/or data defining the trajectory joint 404 may be derived at various time points, namely at each animation update step. The animation data may explicitly specify the geometric data and/or the trajectory joint 404 for each animation update step; alternatively, for each animation update step, the animation data may specify a change to be applied to the geometric data and/or the trajectory joint 404 from the preceding animation update step.

3—Animation Engine

Figure 6:
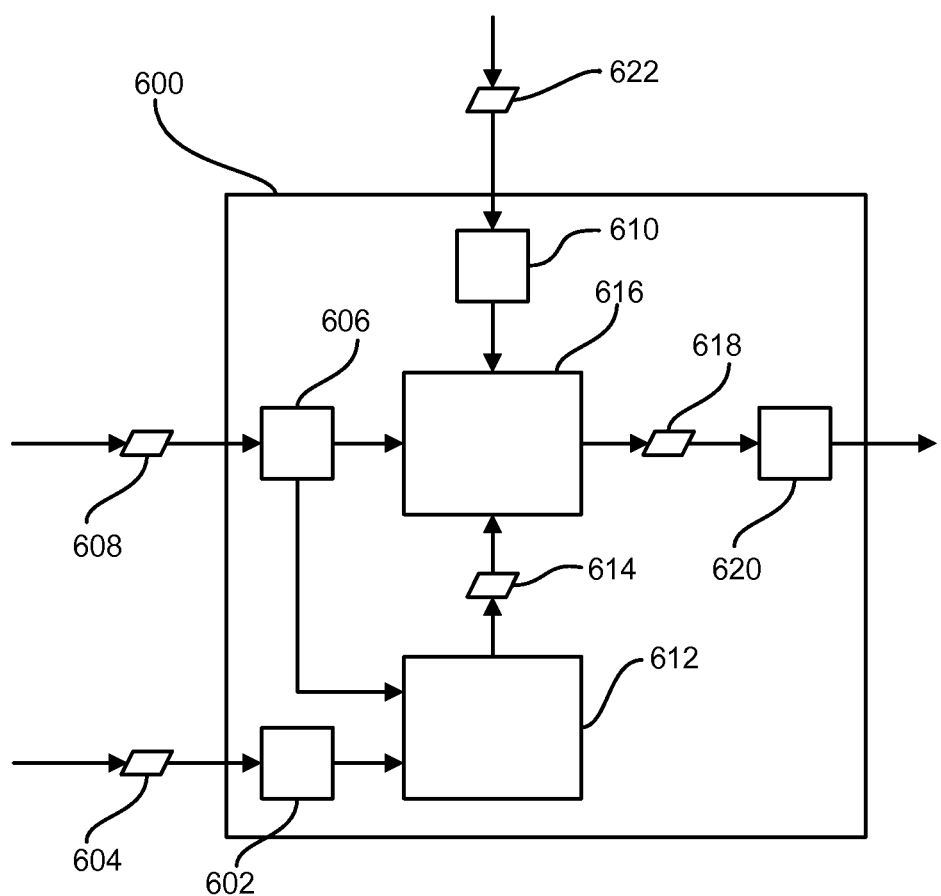
FIG. 6 schematically illustrates an overview of an animation engine according to embodiments of the invention.

FIG. 6 schematically illustrates an overview of an animation engine 600 according to embodiments of the invention. The animation engine 600 may be implemented as part of a computer/video game, as part of an animation authoring tool, as part of an editing system, as part of a visual effects tool, etc.

The animation engine 600 provides a first interface 602, a second interface 606, a third interface 610, a weight generation module 612, a blending module 616, and an output 620.

The first interface 602 is arranged to receive, or obtain, one or more control parameters 604. A control parameter 604 is a value for a property for the animation/motion/behaviour/action of a virtual object 200. Examples of control parameters 604 include: an intended (or target or desired) direction in which the virtual object 200 is to move within the virtual world 202; an intended speed with which the virtual object 200 is to move within the virtual world 202; an intended angle at which the virtual object 200 is to lean; an intended angular velocity with which the virtual object 200 is to rotate; an intended direction in which the virtual object 200 is to face or a location in the virtual world 202 towards which the virtual object 200 is to look; etc. A control parameter 604 may be specified in units of (or appropriate to) the virtual world 202, e.g. with distance, time, mass units. A control parameter 604 may be specified as a point (such as a 2- or 3-dimensional point in the virtual world 202 or relative to the virtual object 200)—this may be used, for example, for carrying out actions such as "reaching" or "placing limbs" of the virtual object 200 within the virtual world 202. Thus, the animation engine 600 may be arranged so that its first interface 602 can accept, or receive as an input, one or more particular control parameters 604. The control parameters 604 may be received, for example, directly from a user (e.g. a user of an animation authoring tool or editing system or visual effects tool), from a component of a computer game that requests that a virtual object 200 be animated according to certain criteria (as specified in the control parameters 604) which could, for example, be based on input from a player of the game; or from any other source that wishes to control or generate an animation.

The second interface 606 is arranged to receive, or obtain, animation data 608 relating to (or that define) one or more animations for the virtual object 200 that is to be animated. The animation data 608 may be, for example, data stored in the storage medium 104 or the memory 106. The animation engine 600 may simply receive the animation data 608 in a push-like model; alternatively, the animation engine 600 may select and then request or access the animation data 608 based on a command or other data that the animation engine 600 has received (for example, in response to the animation engine 600 being instructed that a human character is to change its location within the virtual world 202, the animation engine 600 may determine that it needs animation data 608 for a "walk" animation and for a "run" animation for the human character).

The third interface 610 is arranged to receive, or obtain, character data 622 defining the current state of, and/or properties of, the virtual object 200 that is to be animated. The data 622 may comprise, for example, one or more of the topological data, geometric data, physical data, trajectory data, skinning data, and rendering data for the virtual object 200, as discussed above.

The weight generation module 612 is arranged to receive the control parameters 604 received at the first interface 602 and, from those received control parameters 604, determine one or more blend weights 614. The operation of the weight generation module 612 shall be described in more detail shortly. The weight generation module 612 may be arranged to receive some or all of the animation data 608 received at the second interface 606 and use that animation data 608 to control, at least in part, how the weight generation module 612 generates the blend weights 614 from the received control parameters 604.

The blending module 616 is arranged to receive the animation data 608 received at the second interface 606 and the blend weights 614 generated by the weight generation module 612, and to blend the animations corresponding to the animation data 608 based on the blend weights 614. The blending takes into account the character data 622 so that the blended animation is suitable for the virtual object 200 to be animated. As blending of animations is well-known in this field of technology, it shall not be described in detail herein. The blending of the animations generates output animation data 618.

If the received animation data 608 relates to a single animation (so that no blending is to take place), then the weight generation module 612 may be arranged to provide a blend weight 614 indicating that the output animation data 618 should be based on animating the virtual object 200 using just the received animation data 608 (i.e. so that blending of multiple animations does not occur)—this may be viewed as performing a "null" blend, i.e. a blend of the single animation represented by the received animation data 608 with no other animations.

The output 620 is arranged to receive animation data 618 representing the output/final animation generated by the blending module 616. The output 620 outputs the animation data 618 to a target recipient, for example a module arranged to render or store the output animation, a component of a game that is arranged to use the output animation, a second/further animation engine 600, etc.

It will be appreciated that the animation engine 600 may be implemented as hardware and/or software. It will also be appreciated that the animation engine 600 may take different forms. For example, the interfaces 602, 606 and 610 may be combined into two interfaces or a single interface; the weight generation module 612 may be combined with the blending module 616 to form a single module. Other modifications, providing additional or alternative functionality, may be made. In essence, all that is required is that the animation engine 600 is able to convert one or more control parameters 604 into a corresponding set of one or more blend weights 614 which can be used to blend two or more animations for a virtual object 200.

Figure 7:
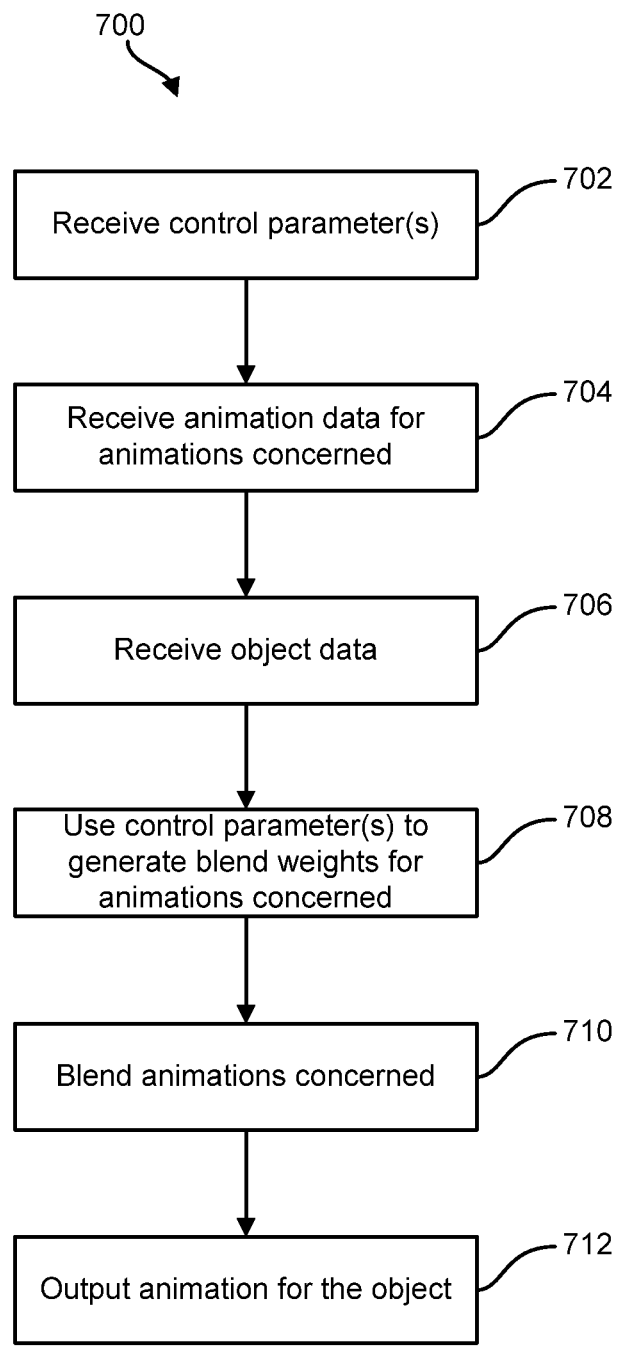
FIG. 7 is a flowchart illustrating a method performed by, or the operation of, the animation engine of FIG. 6 according to an embodiment of the invention.

FIG. 7 is a flowchart illustrating a method 700 performed by, or the operation of, the animation engine 600 of FIG. 6.

At a step 702, the animation engine 600 receives, or obtains, one or more control parameters 604 at the first interface 602.

At a step 704, the animation engine 600 receives, or obtains, the animation data 608 at the second interface 606.

At a step 706, the animation engine 600 receives, or obtains, the character data 622 at the third interface 610.

It will be appreciated that the steps 702, 704 and 706 may be performed in any order or concurrently. It is possible that the animation data 608 may be predetermined, in which case the animation engine 600 may already have accessed or may already be storing the animation data 608, in which case the step 704 may be omitted. Similarly, it is possible that the character data 622 may be predetermined, in which case the animation engine 600 may already have accessed or may already be storing the character data 622, in which case the step 706 may be omitted.

At a step 708, the weight generation module 612 generates the blend weights 614 based on the one or more control parameters 604. This shall be described in more detail shortly.

At a step 710, the blending module 616 blends the animations corresponding to the animation data 608 based on the blend weights 614, thereby generating the animation data 618 defining an output animation.

At a step 712, the output 620 outputs the animation data 618. This may involve simply passing the animation data 618 to a subsequent processing module (for example, the animation data 618 may be used as input animation data 608 for a further blending operation), may involve storing the animation data 618, may involve rendering the animation data, etc.

4—Control Parameter Space and Blend Weight Space

Figure 8:
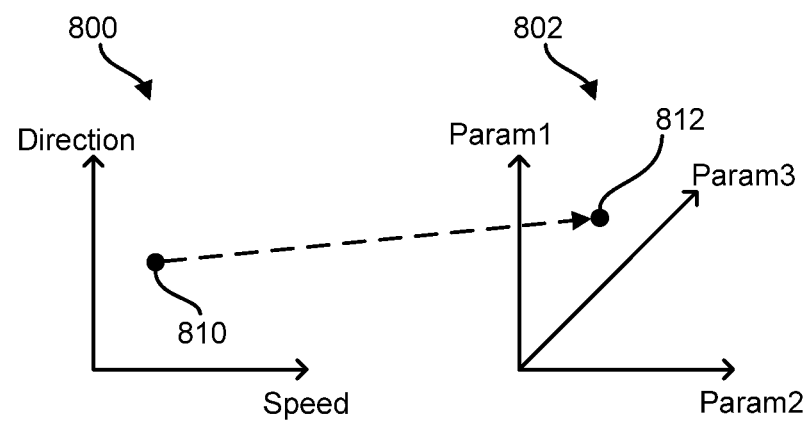
FIG. 8 schematically illustrations the relationship between a control parameter space and a blend weight space.

FIG. 8 schematically illustrations the relationship between a control parameter space 800 and a blend weight space 802.

In FIG. 8, there are two control parameters, namely the "speed" and the "direction" of the virtual object 200 within the virtual world 202. These control parameters therefore define a two-dimensional control parameter space 800. However, it will be appreciated that different control parameters could be used (as discussed above) and that a different number M of control parameters could be used to thereby define a corresponding M-dimensional control parameter space 800.

Similarly, in FIG. 8, there are three blend weights, namely "Param1", "Param2" and "Param3", representing respective weights for blending three different animations (such as a "walk", "run" and "jump" animation for the virtual object 200). These blend weights therefore define a three-dimensional blend weight space 802. However, it will be appreciated that a different number N of animations could be involved in the animation blending and that they will have respective blend weights defining a corresponding N-dimensional blend weight space 802.

As shown in FIG. 8, given a point 810 in the control parameter space 800, the weight generation module 612 is arranged to map the control parameters defined by that point 810 to a corresponding point 812 in the blend weight space 802. Thus, the particular desired combination of speed and direction represented by the point 810 in FIG. 8 is mapped to a respective triple of blend weights represented by the point 812—if this triple of blend weights is provided to the blending module 616, then the blending module 616 will blend the three corresponding animations based on these blend weights and the output animation that is thereby generated will have characteristics substantially matching the initial desired control parameters (as represented by the point 810).

Figure 9:
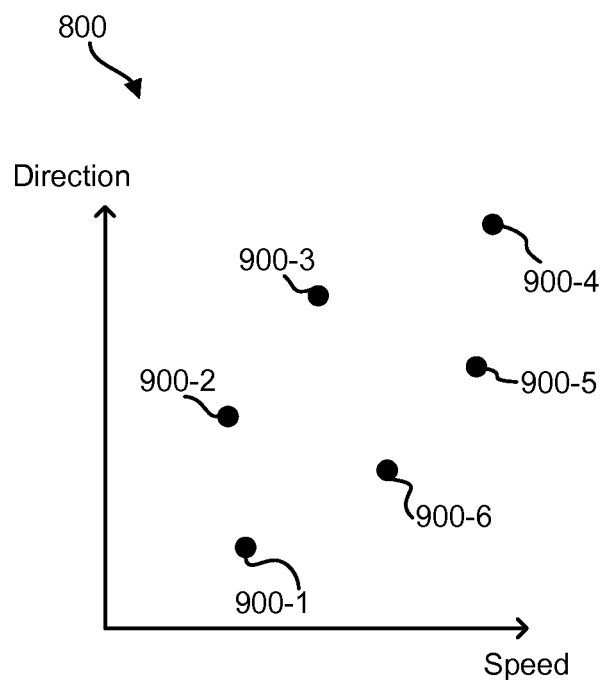
FIG. 9 schematically illustrates points in a control parameter space.

In embodiments of the invention, there is an initial set of N predetermined animations that are available for animating the virtual object 200—for example, for a human character, there may be predetermined animations for making the human character walk, run, jump, crawl, etc. The animation engine 600 may be used to perform each of these animations to thereby animate the virtual object 200 within the virtual world 202—in doing so, values for the control parameters may be determined or measured, where these control parameter values then correspond to a set of values for the blend weights that indicates only using that particular animation. Additionally or alternatively, the animation engine 600 may be used to perform one or more blends, using a respective set of values for the blend weights, of two or more of these animations to thereby animate the virtual object 200 within the virtual world 202—in doing so, respective values for the control parameters that correspond to those sets of values for the blend weights may be determined or measured. For example, as shown in FIG. 9, each of six animations of the virtual object 200 performed as set out above (be that performing a single animation for the virtual object 200 or performing a blend of multiple animations for the virtual object 200) corresponds to a respective point 900-1, . . . , 900-6 in the control parameter space 800, i.e. for each of the six animations carried out, the direction and speed for the virtual object 200 (i.e. the control parameters for this example) when that virtual object 200 is animated using the correspond set of blend weights may be measured, so that that animation then corresponds to a respective point 900.

Thus, using the animation engine 600, a plurality of points 900 (referred to below as examples, samples, or "annotations") may be identified, where each annotation 900 corresponds to a set of blend weights for the N predetermined animations, such that performing a blend for the virtual object 200 using that set of blend weights for those N predetermined animations results in an animation of the virtual object 200 having control parameters represented by that annotation 900 in the control parameter space 800.

In some embodiments, the intention of the animator is that all of the N predetermined animations may be blended together. In other embodiments, there may be one or more predetermined subsets of the N predetermined animations, where each subset corresponds to a group of animations that can be blended together—blending may then only take place between animations that lie within one of the subsets of the predetermined animations. This is taken into account in the above when determining the annotations 900.

In some embodiments, a user may, in addition or as an alternative to using the animation engine to measure (or identify or define) the control parameters for one or more of the annotations 900, define their own annotations manually, for example by personally indicating or specifying values for the control parameters (e.g. values that the user perceives) when a particular set of blend parameters is used.

Figure 10:
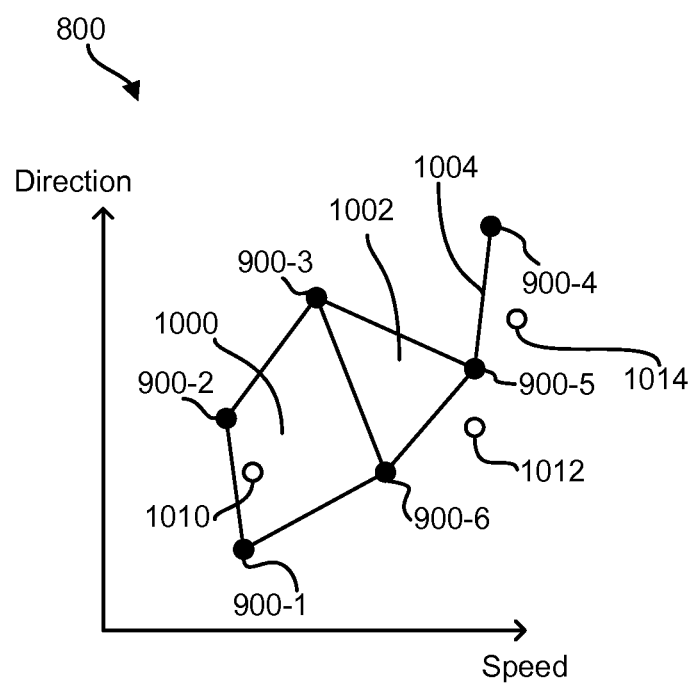
FIG. 10 schematically illustrates annotation-regions.

A user may specify one or more subsets of the annotations 900, each subset comprising two or more respective annotations 900. Each subset of annotations 900 defines a corresponding region (or a subspace or a portion or a polytope) in the control parameter space 800—such a region shall be referred to herein as an "annotation-region". An annotation-region is a region or polytope or portion of the control parameter space 800 that corresponds to, and is defined by, a plurality of annotations 900 in the control parameter space 800. The subsets of annotations 900 are usually chosen so that the corresponding annotation-regions do not overlap each other. This is illustrated in FIG. 10. In particular, a first subset of annotations {900-1, 900-2, 900-3, 900-6} forms an annotation-region 1000 in the control parameter space 800. A second subset of annotations {900-3, 900-5, 900-6} forms an annotation-region 1002 in the control parameter space 800. A third subset of annotations {900-4, 900-5} forms an annotation-region (in this case a line) 1004 in the control parameter space 800.

The purpose of identifying one or more annotation-regions is that, when a particular point in the control parameter space 800 is specified (e.g. when wishing to perform a blend so as to achieve an animation corresponding to that point in the control parameter space 800), then that point will be closest to a particular annotation-region—it is the set annotations 900 that define that "closest" annotation-region that are then used to help determine the blend weights to use to carry out a blend so as to achieve an animation corresponding to that point in the control parameter space 800.

Relating this, then, to the method of FIG. 7, at the step 702 a set of one or more control parameters is received or obtained. This set of one or more control parameters therefore corresponds to a point in the control parameter space 800—in FIG. 10, three such example points 1010, 1012 and 1014 are illustrated. The annotations 900 that are to be used to help determine the blend weights to use to generate an animation that corresponds to the control parameter points 1010, 1012 and 1014 may be determined by determining which of the annotation-regions 1000, 1002 and 1004 those points 1010, 1012 and 1014 are closest to—in FIG. 10, the point 1010 is inside the annotation-region 1000 and hence the four annotations 900-1, 900-2, 900-3 and 900-6 that define the annotation-region 1000 are the annotations 900 that will be used to help determine the blend weights for carrying out the blend at the step 710 when the control parameters received at the step 702 correspond to the point 1010; the point 1012 is closest to the annotation-region 1002 and hence the three annotations 900-3, 900-5 and 900-6 that define the annotation-region 1002 are the annotations 900 that will be used to help determine the blend weights for carrying out the blend at the step 710 when the control parameters received at the step 702 correspond to the point 1012; and the point 1014 is closest to the annotation-region 1004 and hence the two annotations 900-4 and 900-5 that define the annotation-region 1004 are the annotations 900 that will be used to help determine the blend weights for carrying out the blend at the step 710 when the control parameters received at the step 702 correspond to the point 1014. The animation data relating to those animations needed for the annotations 900 of the selected annotation-region is the animation data 608 that is received at the step 704.

As mentioned above with respect to FIG. 8, given a point 810 in the control parameter space 800, the weight generation module 612 is arranged to map the control parameters defined by that point 810 to a corresponding point 812 in the blend weight space 802. In the following, methods for establishing this mapping/function are described, and methods for applying the mapping when actually carrying out animation blending are described. The establishment of the mapping may be carried out prior to runtime, i.e. the mapping may be predetermined so that, at runtime, when the animation blending is to be performed, the predetermined mapping may be used. For example, the mapping may be determined as a pre-processing/offline step so that the mapping can form part of the implementation of the animation engine 600 (e.g. a part of a compiled software module for the animation engine 600). The application/use of the mapping is, naturally, carried out at runtime when performing animation blending. The generation of the mapping may be carried out by a first entity, using a first computer system 100, with the mapping then being incorporated into, or provided to, a second entity that uses a second computer system 100 to carry out animations using the mapping.

5—Determining the Mapping from the Control Parameter Space to the Blend Weight Space Firstly, the notion of Barycentric coordinates shall be introduced. Consider an M-dimensional control parameter space 800, which is defined by control parameters $CP_i$ (i=1, ..., M). For example, $CP_1$ may represent the speed of the virtual object 200 within the virtual world 202, $CP_2$ may represent the direction of the virtual object 200 within the virtual world 202, etc. Suppose that there are K predetermined points $X_i$ (i=1, ..., K) in the control parameter space, each point $X_i$ having a respective M-dimensional position vector $v_i$ in the control parameter space (i=1, ..., K). For any point P in the control parameter space with position vector p, if $$p = \frac{w_1}{\sum_{i=1}^{K} w_i} v_1 + \frac{w_2}{\sum_{i=1}^{K} w_i} v_2 + \ldots + \frac{w_K}{\sum_{i=1}^{K} w_i} v_K$$

for some values $w_j$ (j=1, ..., K), then the vector $w=(w_1, w_2, \ldots, w_K)$ is a "barycentric coordinate" of the point P with respect to the points $X_1, X_2, \ldots, X_K$. The point $X_1$ itself has a barycentric coordinate of (1, 0, 0, ..., 0); the point $X_2$ itself has a barycentric coordinate of (0, 1, 0, . . . , 0); etc. Barycentric coordinates are, in general, not unique: for example, if $(w_1, w_2, \ldots, w_K)$ is a barycentric coordinate of the point P with respect to the points $X_1, X_2, \ldots, X_K$ then so is the coordinate $(bw_1, bw_2, \ldots, bw_K)$ for any non-zero value b.

In the following, it will be assumed that barycentric coordinate $w=(w_1, w_2, \ldots, w_K)$ for the point P with respect to the points $X_1, X_2, \ldots, X_K$ satisfies $$p = \frac{w_1}{\sum_{i=1}^{K} w_i} v_1 + \frac{w_2}{\sum_{i=1}^{K} w_i} v_2 + \ldots + \frac{w_K}{\sum_{i=1}^{K} w_i} v_K$$

so that the position vector p of the point P is $$p = \sum_{i=1}^{K} w_i v_i = w \cdot v,$$

where w·v is the dot product of the vector w with the vector (of vectors) $v=[v_1, v_2, \ldots, v_K]$. However, this is purely for convenience of explanation and this is not essential to embodiments of the invention.

For the set of points $X_1, X_2, \ldots, X_K$ in the control parameter space 800, the region corresponding to, or defined by, those points, is the set of points P that have a barycentric coordinate $w=(w_1, w_2, \ldots, w_K)$ with respect to the points $X_1, X_2, \ldots, X_K$ such that $0 \le w_i \le 1$ for each $w_i$ (i=1, . . . , K). Thus, if the points $X_1, X_2, \ldots, X_K$ are annotations 900 that together define an annotation-region, then this annotation-region is the set of points P that have a barycentric coordinate $w=(w_1, w_2, \ldots, w_K)$ with respect to the points $X_1, X_2, \ldots, X_K$ such that $0 \le w_i \le 1$ for each $w_i$ (i=1, . . . , K).

FIGS. 11a-11d provide examples of the use of barycentric coordinates.

Figure 11A:
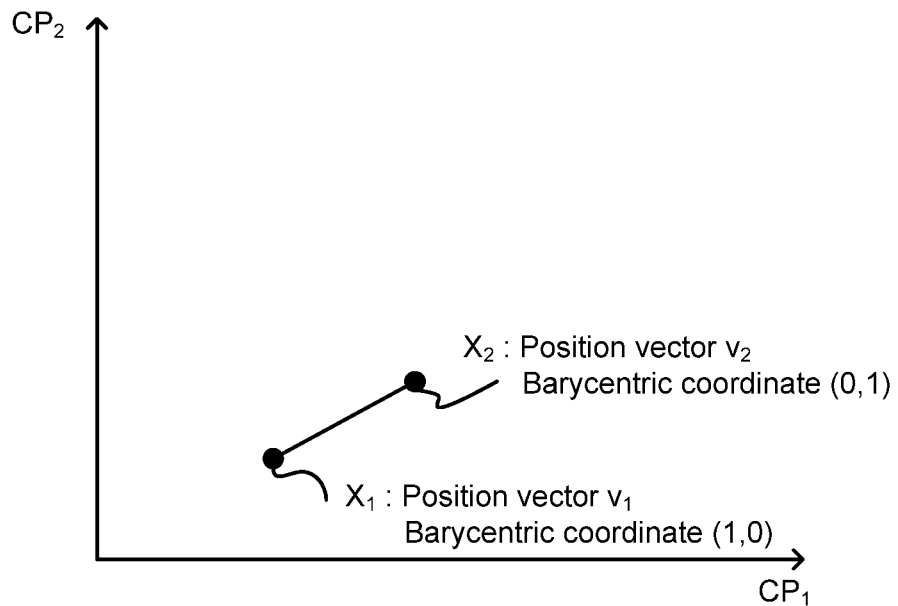
FIGS. 11a-11d schematically illustrate examples of the use of barycentric coordinates.

In FIG. 11a, the control parameter space is 2-dimensional, and barycentric coordinates are being defined with respect to two points $X_1$ and $X_2$ having respective position vectors $v_1$ and $v_2$ and which themselves have respective barycentric coordinates of (1,0) and (0,1).

Figure 11B:
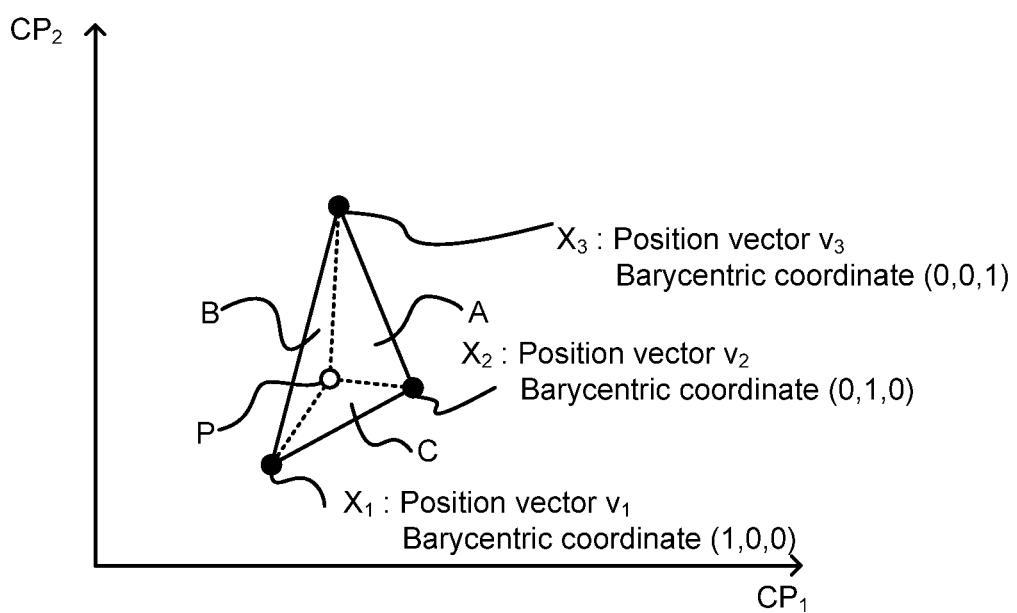

In FIG. 11b, the control parameter space is 2-dimensional, and barycentric coordinates are being defined with respect to three points $X_1, X_2$ and $X_3$ having respective position vectors $v_1, v_2$ and $v_3$ and which themselves have respective barycentric coordinates of (1,0,0), (0,1,0) and (0,0,1).

Figure 11C:
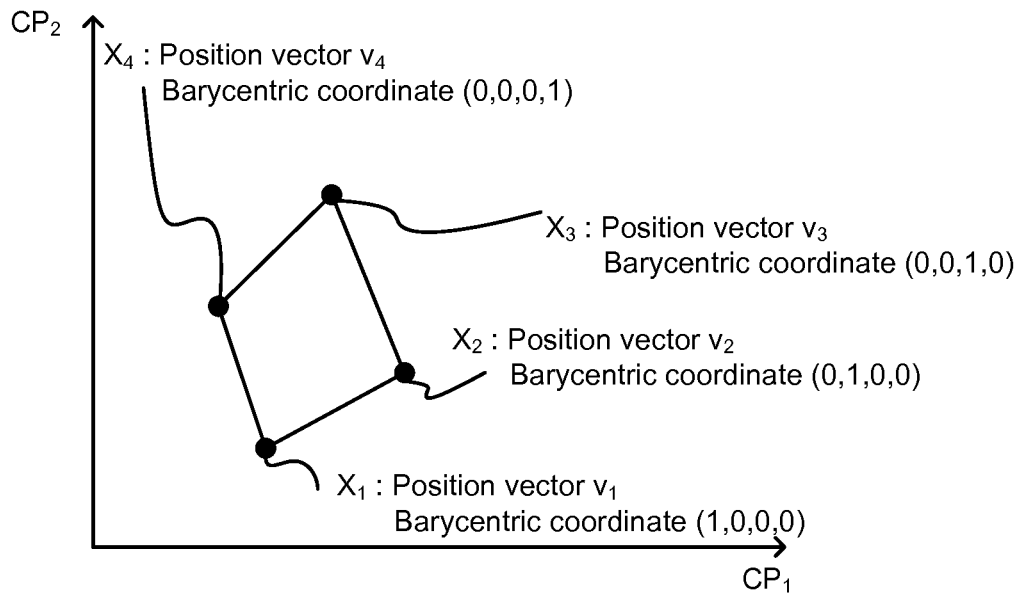

In FIG. 11c, the control parameter space is 2-dimensional, and barycentric coordinates are being defined with respect to four points $X_1, X_2, X_3$ and $X_4$ having respective position vectors $v_1, v_2, v_3$ and $v_4$ and which themselves have respective barycentric coordinates of (1,0,0,0), (0,1,0,0), (0,0,1,0) and (0,0,0,1).

Figure 11D:
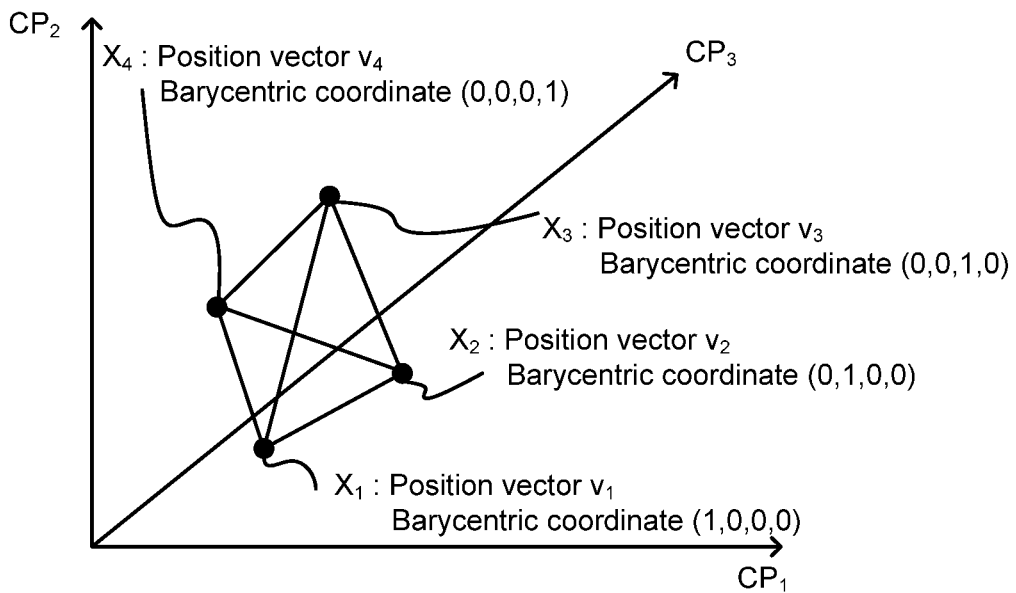

In FIG. 11d, the control parameter space is 3-dimensional, and barycentric coordinates are being defined with respect to four points $X_1, X_2, X_3$ and $X_4$ having respective position vectors $v_1, v_2, v_3$ and $v_4$ and which themselves have respective barycentric coordinates of (1,0,0,0), (0,1,0,0), (0,0,1,0) and (0,0,0,1).

Turning to FIG. 11b, given any point P in the control parameter space, three triangles A, B and C are formed: triangle A is formed from the points P, $X_2$ and $X_3$; triangle B is formed from the points P, $X_1$ and $X_3$; and triangle C is formed from the points P, $X_1$ and $X_2$. The barycentric coordinate of the point P relative to the points $X_1, X_2$ and $X_3$ is $w=(w_1, w_2, w_3)$, where $w_1$ is the area of the triangle A divided by the sum of the areas of the three triangles A, B and C, $w_2$ is the area of the triangle B divided by the sum of the areas of the three triangles A, B and C, and $w_3$ is the area of the triangle C divided by the sum of the areas of the three triangles A, B and C. In FIG. 11b, if the positions vectors within the control parameter space of the points $X_1, X_2$ and $X_3$ are $v_1=(x_1,y_1)$, $v_2=(x_2,y_2)$ and $v_3=(x_3,y_3)$, and if the position vector within the control parameter space of the point P is p, and if we define the matrix $$T = \begin{bmatrix} x_1 - x_3 & x_2 - x_3 \\ y_1 - y_3 & y_2 - y_3 \end{bmatrix},$$

then $w_1$ and $w_2$ can be calculated as $[w_1 w_2] = T^{-1}(p-v_3)$, and $w_3$ can be calculated as $w_3 = 1 - w_1 - w_2$.

Barycentric coordinates, and the calculation thereof, are well-known. Thus, we shall not describe in more detail herein how the barycentric coordinates of a point P in the control parameter space may be determined in the scenarios depicted in FIGS. 11a, 11c or 11d, or, indeed, in more general control parameter spaces of different dimensions and with different numbers K of reference points $X_i$ (i=1, . . . , K).

Figure 12:
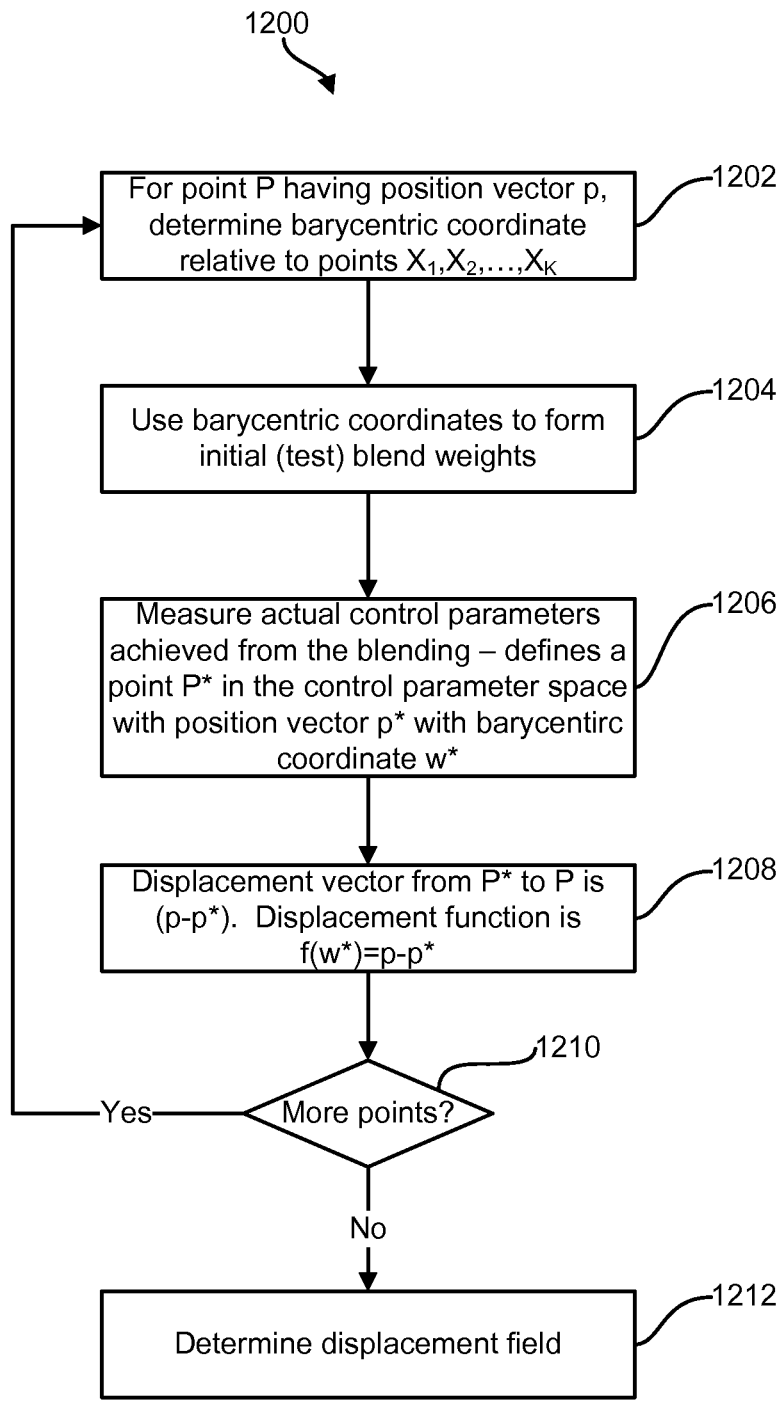
FIG. 12 is a flowchart illustrating a method of determining a "displacement field" for, or relative to, a group of predetermined reference points in a control parameter space, according to an embodiment of the invention.

FIG. 12 is a flowchart illustrating a method 1200 of determining a "displacement field" for, or relative to, a group of K (where K>1) predetermined reference points $X_1, X_2, \ldots, X_K$ in the control parameter space 800. Each reference point $X_i$ (i=1, . . . , K) is an annotation 900, where the reference points $X_1, X_2, \ldots, X_K$ are grouped together to form one of the predetermined annotation-regions. As described above, each of the reference points $X_1, X_2, \ldots, X_K$ corresponds to a respective known set of values for the blend weights for blending one or more of the N predetermined animations for the virtual object 200.

Figure 13:
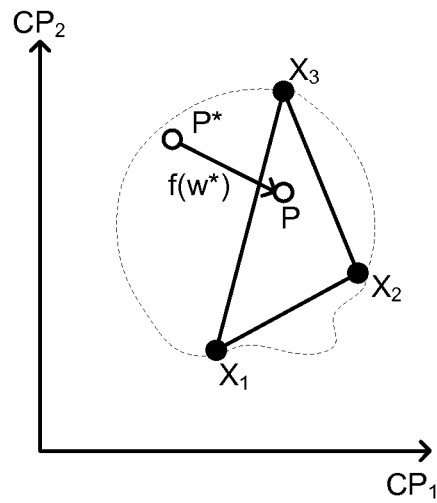
FIG. 13 schematically illustrates a control parameter space to help illustrate the method of FIG. 12.

Initial steps 1202, 1204, 1206 and 1208 of the method 1200 shall be described with reference to the example illustrated in FIG. 13. The example in FIG. 13 has a 2-dimensional control parameter space 800 and makes use of three reference points $X_1, X_2$ and $X_3$—however, it will be appreciated that FIG. 13 is provided purely for illustration purposes and that the method 1200 of FIG. 12 can be applied to other control parameter spaces 800 with different dimensions and with different numbers K of reference points.

At the step 1202, a test/example point P in the control parameter space 800 is chosen. The point P has a position vector p within the control parameter space 800. The point P is chosen to lie inside, or on the edge/face/perimeter/boundary, of the annotation-region in the control parameter space 800 defined by the reference points $X_1, X_2, \ldots, X_K$. In the example of FIG. 13, the point P lies inside, or on the edge of, the triangle having vertices $X_1, X_2$ and $X_3$. In some embodiments, the point P is chosen to lie on a straight line in the control parameter space 800 that connects two of the reference points $X_1, X_2, \ldots, X_K$. The barycentric coordinate $w=(w_1, w_2, \ldots, w_K)$ of the point P, with reference to the points $X_1, X_2, \ldots, X_K$ is determined.

At the step 1204, the coefficients $w_i$ are used to form initial (test or example) blend weights. In particular, for the n-th predetermined animation (n=1, . . . , N), let the blend weight corresponding to that n-th animation for the $i^{th}$ reference point $X_i$ (i=1, . . . , K) be $\alpha_{i,n}$. The initial (test) blend weight $\beta_n$ corresponding to that n-th animation may be determined as a function, g, of the blend weights $\alpha_{i,n}$ and the coefficients $w_i$. For example, g may represent a weighted linear combination of the values $\alpha_{i,n}$, so that $$\beta_n = g(w_1, \ldots, w_K, \alpha_{1,n}, \ldots, \alpha_{K,n}) = \sum_{i=1}^{K} w_i \alpha_{i,n}.$$

One could write $(\beta_1, \ldots, \beta_N) = \hat{g}(w_1, \ldots, w_K, X_1, \ldots, X_K)$, where $\hat{g}$ determines each coefficient $\beta_n$ using the above function g (since the values $\alpha_{i,n}$ are weights associated with the point $X_i$)—the function $\hat{g}$ represents normal linear barycentric interpolation. It will be appreciated that, for the $n^{th}$ animation of the N predetermined animations, the corresponding value of $\alpha_{i,n}$ may be 0 for all $i=1, \ldots, K$, in which case the value of $\beta_n$ need not be calculated, as the $n^{th}$ animation may be excluded from the blending that is to be performed based on the reference points $X_1, \ldots, X_K$. It will be appreciated that other methods, or functions g, for determining initial test blend weights could be used.

The animation engine 600 is used to animate the virtual object 200 within the virtual world 202 by carrying out a blend using the test blend weights.

At the step 1206, the control parameters that correspond to the animation performed at the step 1204 are measured. For example, if the control parameters that define the control parameter space are the "speed" and "direction" of the virtual object 200 within the virtual world 202, then the speed and direction of the virtual object 200, when animated at the step 1204, are measured. These measured control parameters correspond to a point P* within the control parameter space 800. The point P* has a position vector p* within the control parameter space 800. The barycentric coordinate w* of the point P*, with reference to the points $X_1, X_2, \ldots, X_K$, may be determined.

The vector (p-p*) defines a displacement, or a displacement vector, from the point P* to the point P. Thus, at the step 1208, for the barycentric coordinate w*, the value of a displacement function f is defined as f(w*)=(p-p*). If the dimension M of the control parameter space is M=1, then f(w*) is a scalar value (which may be viewed as a vector of dimension 1); if the dimension M of the control parameter space is M>1, then f(w*) is a vector with M components.

The steps 1202, 1204, 1206 and 1208 are repeated in respect of one or more further points P. Thus, at a step 1210, it is determined whether there are one or more further points P that need to be processed—if there are one or more further points P that need to be processed, then processing returns to the step 1202 in relation to a next one of these further points P; otherwise, processing continues at a step 1212. Embodiments of the invention may, therefore, specify a predetermined number T of points $P_1, P_2, \ldots, P_T$ that are to be processed by the steps 1202, 1204, 1206 and 1208—this results in T respective barycentric coordinates $w^*_1, w^*_2, \ldots, w^*_T$ being calculated at the step 1206 and T corresponding values $f(w^*_1), f(w^*_2), \ldots, f(w^*T)$ of the displacement function being set at the step 1208. The points $P_1, P_2, \ldots, P_T$ may be chosen at random within the annotation-region, or they may be distributed evenly within the annotation-region, or some other selection criteria may be used to select the points $P_1, P_2, \ldots, P_T$. The value of T may be chosen so as to try to achieve a desired level of accuracy in the displacement field that will be generated by the method 1200—the greater the value T, the more data is available (in terms of pairs of barycentric coordinates $w^*_i$ and corresponding values $f(w^*_i)$) to generate the displacement field.

The intention is that, given any point, with barycentric coordinate w, on or within the annotation-region defined by the reference points $X_1, X_2, \ldots, X_K$, a corresponding displacement f(w) can be calculated. Thus, at the step 1212, the T respective barycentric coordinates $w^*_1, w^*_2, \ldots, w^*_T$ calculated at the step 1206 and their T corresponding values $f(w^*_1), f(w^*_2), \ldots, f(w^*_T)$ of the displacement function are used to determine the displacement function f in general (which may be viewed as a displacement field or a vector field) for the set of reference points $X_1, X_2, \ldots, X_K$.

In one embodiment, the processing at the step 1212 operates as follows. As mentioned above, the displacement function f outputs a displacement having M coefficients. The function f may be derived as follows for each of the M coefficient positions of the displacement. In particular, for the $j^{th}$ coefficient position of the displacement:

Each of the T sample points $P_i$ (i=1, ..., T) results in a pair $(w^*_i, f(w^*_i))$.

$f(w^*_i)$ will have a value $b_{i,j}$ at its $j^{th}$ coefficient position (i=1, ..., T).

Let $w^*_i$ be the K-dimensional vector $(w^*_{i,1}, w^*_{i,2}, \ldots, w^*_{i,K})$ (i=1, ..., T).

The use of a first order Taylor series to approximate the function f provides that:

$$b_{i,j} = \sum_{x=1}^{K} a_{x,j} w^*_{i,x} + \sum_{x=1}^{K-1} \sum_{y=x+1}^{K} a_{x,y,j} w^*_{i,x} w^*_{i,y}$$

for some values $a_{x,j}$ (x=1, ..., K) and $a_{x,y,j}$ (1≤x≤y≤K). The actual values of $a_{x,j}$ (x=1, ..., K) and $a_{x,y,j}$ (1≤x≤y≤K) are not important at this stage—all that is of relevance is the form/structure of this equation.

Thus, the T sample points $P_i$ (i=1, ..., T) result in a system of equations as follows:

$$\begin{bmatrix} b_{1,j} \\ b_{2,j} \\ \vdots \\ b_{T,j} \end{bmatrix} \approx \begin{bmatrix} w^*_{1,1} & \cdots & w^*_{1,K} & w^*_{1,1} w^*_{1,2} & \cdots & w^*_{1,K-1} w^*_{1,K} \\ w^*_{2,1} & \cdots & w^*_{2,K} & w^*_{2,1} w^*_{2,2} & \cdots & w^*_{2,K-1} w^*_{2,K} \\ \vdots & \ddots & \vdots & \vdots & \ddots & \vdots \\ w^*_{T,1} & \cdots & w^*_{T,K} & w^*_{T,1} w^*_{T,2} & \cdots & w^*_{T,K-1} w^*_{T,K} \end{bmatrix} \begin{bmatrix} a_{1,j} \\ \vdots \\ a_{K,j} \\ a_{1,1,j} \\ \vdots \\ a_{K-1,K,j} \end{bmatrix}$$

A least-squares best fit can be used to determine values $a_{x,j}$ (x=1, ..., K) and $a_{x,y,j}$ (1≤x<y≤K) for this system of equations. However, it will be appreciated that other methods could be used to determine values $a_{x,j}$ (x=1, ..., K) and $a_{x,y,j}$ (1≤x<y≤K) for this system of equations (such as absolute difference techniques, L1 norm techniques, or any other matrix solution method).

Then, given a barycentric coordinate w=$(w_1, w_2, \ldots, w_K)$, the $j^{th}$ coefficient $b_j$ of the corresponding displacement f(w) can be defined $$\text{as } b_j = \sum_{x=1}^{K} a_{x,j} w_x + \sum_{x=1}^{K-1} \sum_{y=x+1}^{K} a_{x,y,j} w_x w_y.$$

In another embodiment, the processing at the step 1212 operates as follows. As mentioned above, the displacement function f outputs a displacement having M coefficients. The function f may be derived as follows for each of the M coefficient positions of the displacement. In particular, for the $j^{th}$ coefficient position of the displacement:

Each of the T sample points $P_i$ (i=1, ..., T) results in a pair $(w^*_i, f(w^*_i))$.

$f(w^*_i)$ will have a value $b_{i,j}$ at its $j^{th}$ coefficient position (i=1, ..., T).

Let $w^*_i$ be the K-dimensional vector $(w^*_{i,1}, w^*_{i,2}, ..., w^*_{i,K})$ (i=1, ..., T).

The use of a second order Taylor series to approximate the function f provides that:

$$b_{i,j} = \sum_{x=1}^{K} a_{x,j} w^*_{i,x} + \sum_{x=1}^{K-1} \sum_{y=x+1}^{K} a_{x,y,j} w^*_{i,x} w^*_{i,y} + \sum_{x=1}^{K} \sum_{\substack{y=1 \\ y \neq x}}^{K} a'_{x,y,j} (w^*_{i,x})^2 w^*_{i,y}$$

for some values $a_{x,j}$ (x=1, ..., K), $a_{x,y,j}$ (1≤x<y≤K) and $a'_{x,y,j}$ (1≤x,y≤K,x≠y). The actual values of $a_{x,j}$ (x=1, ..., K), $a_{x,y,j}$ (1≤x<y≤K) and $a'_{x,y,j}$ (1≤x,y≤K, x≠y) are not important at this stage—all that is of relevance is the form/structure of this equation.

Thus, the T sample points $P_i$ (i=1, ..., T) result in a system of equations as follows:

$$\begin{bmatrix} b_{1,j} \\ b_{2,j} \\ \vdots \\ b_{T,j} \end{bmatrix} \approx \begin{bmatrix} w^*_{1,1} & \cdots & w^*_{1,K} & w^*_{1,1} w^*_{1,2} & \cdots & w^*_{1,K-1} w^*_{1,K} & (w^*_{1,1})^2 w^*_{1,2} & \cdots & (w^*_{1,K})^2 w^*_{1,K-1} \\ w^*_{2,1} & \cdots & w^*_{2,K} & w^*_{2,1} w^*_{2,2} & \cdots & w^*_{2,K-1} w^*_{2,K} & (w^*_{2,1})^2 w^*_{2,2} & \cdots & (w^*_{2,K})^2 w^*_{2,K-1} \\ \vdots & \ddots & \vdots & \vdots & \ddots & \vdots & \vdots & \ddots & \vdots \\ w^*_{T,1} & \cdots & w^*_{T,K} & w^*_{T,1} w^*_{T,2} & \cdots & w^*_{T,K-1} w^*_{T,K} & (w^*_{T,1})^2 w^*_{T,2} & \cdots & (w^*_{2,K})^2 w^*_{2,K-1} \end{bmatrix} \begin{bmatrix} a_{1,j} \\ \vdots \\ a_{K,j} \\ a_{1,1,j} \\ \vdots \\ a_{K-1,K,j} \\ a'_{1,1,j} \\ \vdots \\ a'_{K,K-1,j} \end{bmatrix}$$

A least-squares best fit can be used to determine values $a_{x,j}$ (x=1, ..., K), $a_{x,y,j}$ (1≤x<y≤K) and $a'_{x,y,j}$ (1≤x,y≤K, x≠y) for this system of equations. However, it will be appreciated that other methods could be used to determine values $a_{x,j}$ (x=1, ..., K), $a_{x,y,j}$ (1≤x<y≤K) and $a'_{x,y,j}$ (1≤x,y≤K,x≠y) for this system of equations (such as absolute difference techniques, L1 norm techniques, or any other matrix solution method).

Then, given a barycentric coordinate $w=(w_1, w_2, ..., w_K)$, the $j^{th}$ coefficient $b_j$ of the corresponding displacement f(w) can be defined as $$b_j = \sum_{x=1}^{K} a_{x,j} w_x + \sum_{x=1}^{K-1} \sum_{y=x+1}^{K} a_{x,y,j} w_x w_y + \sum_{x=1}^{K} \sum_{\substack{y=1 \\ y \neq x}}^{K} a'_{x,y,j} (w_x)^2 w_y.$$

The above two examples make use of first order and second order Taylor series expansions. However, it will be appreciated that other embodiments of the invention may make use of higher order Taylor series. It will also be appreciated that other embodiments of the invention may determine the displacement function in other ways, e.g. other interpolation functions could be used. Thus, other ways can be used of approximating or determining what the value of f(w) is for a general barycentric coordinate w given the known values of $f(w^*_1), f(w^*_2), ..., f(w^*_T)$ that corresponds to the T barycentric coordinates $w^*_1, w^*_2, ..., w^*_T$ calculated at the step 1206.

In essence, the displacement function f takes in a barycentric coordinate w (corresponding to a target point Q with position vector q) relative to the set of predetermined points $X_1, ..., X_K$ and outputs a displacement d with the following property: if $R_Q$ is the point in the control parameter space with position vector q+d having barycentric coordinate $(\tilde{w}_1, ..., \tilde{w}_K)$ relative to $X_1, ..., X_K$, and if the virtual object 200 is animated by blending the N predetermined animations using $(\beta_1, ..., \beta_N) = \hat{g}(\tilde{w}_1, ..., \tilde{w}_K, X_1, ..., X_K)$ as the set of blend weights for the N predetermined animations, then the resulting animation will have control parameters equal to (or at least substantially represented by) the initial point Q. For example, given barycentric coordinate $q=w^*_1$, the point $(R_Q)$ with position vector $q+d=w^*_1+f(w^*_1)$ is the point $P_1$, and the corresponding blended animation results in control parameters corresponding to the point $w^*_1$. Use of the point $R_Q$ in this manner results in a blended animation with control parameters closer to the initially desired control parameters (as represented by the point Q) than if the point Q had been used without the displacement to derive the blend weights (i.e. than if the coefficients of the barycentric coordinate for the point Q were used directly in the function g to derive the blend weights). Thus, the point $R_Q$ determined this way (and whose barycentric coordinate is used in the function g to derive the blend weights for animation blending) compensates for non-linearities introduced when blending the two or more animations—simply using the barycentric coordinate of the initial point Q would not necessarily provide a blended animation that corresponds to the target control parameters represented by the point Q, and such non-linearities or errors are compensated for, or corrected, by using the barycentric coordinates of the point $R_Q$ instead. The above description has provided some examples of how to derive such a displacement function, but it will be appreciated that other methods could be used instead.

The method 1200 of FIG. 12 may be carried out for each of the defined annotation-regions, i.e. each annotation-region may be defined by its own respective subset $\{X_1, ..., X_K\}$ of annotations 900, and a displacement function for that annotation-region may be generated by performing the method 1200 based on those particular annotations $X_1, ..., X_K$. It will be appreciated that there may be only one annotation-region, or there may be multiple annotation-regions.

The displacement functions derived above shall be considered to be a first type of displacement function (referred to below as a "Type 1" displacement function). A Type 1 displacement function that corresponds to a particular annotation-region may be used (as discussed later) to find a displacement given a point P within, or on, that particular annotation-region. In some embodiments of the invention, this suffices. However, in some embodiments of the invention, the initial point P may lie outside the or each of the predetermined annotation-regions. Thus, in addition to the Type 1 displacement function derived for an annotation-region, one or more second types of displacement function (referred to below as "Type 2" displacement functions) may be derived for one or more annotation-regions, as discussed below.

An annotation-region is defined by K respective annotations $X_1, \ldots, X_K$ in the control parameter space. A Type 2 displacement function $f_u$ for an annotation-region may be generated, where $f_u$ corresponds to one of the annotations $X_u$ ($1 \leq u \leq K$). Each of the K annotations $X_1, \ldots, X_K$ may have its own Type 2 displacement function.

Figure 14:
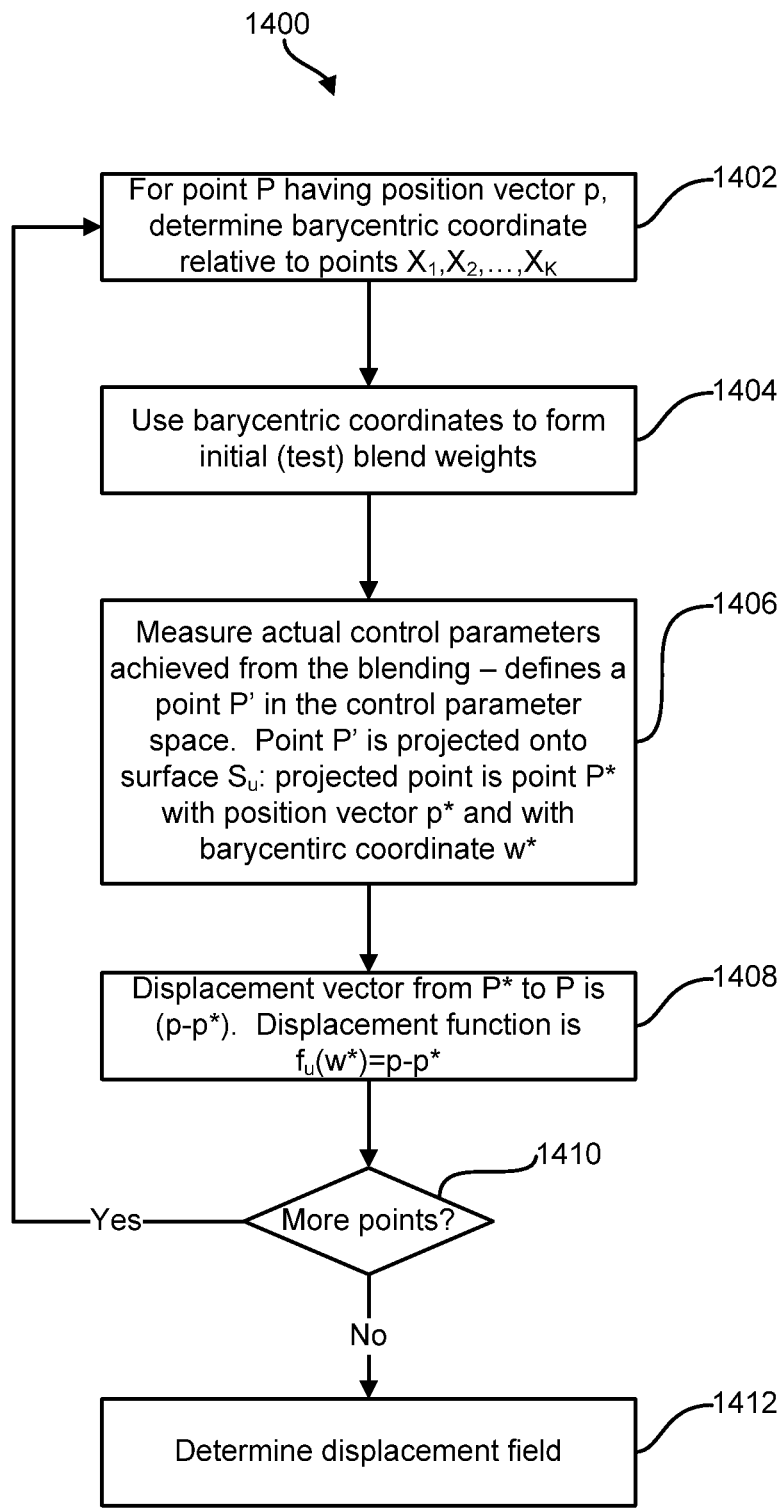
FIG. 14 is a flowchart illustrating a method of determining a Type 2 displacement function according to an embodiment of the invention.

The above-described method for generating a Type 1 displacement function f for the annotation-region may be used to generate a Type 2 displacement function $f_u$ for the annotation $X_u$ by imposing a number of further constraints/modifications. FIG. 14 is a flowchart illustrating a method 1400 of determining a Type 2 displacement function $f_u$ for, or relative to, a group of K (where K>1) predetermined annotations $X_1, X_2, \ldots, X_K$ in the control parameter space 800 that define a corresponding annotation-region (where $1 \leq u \leq K$).

Figure 15:
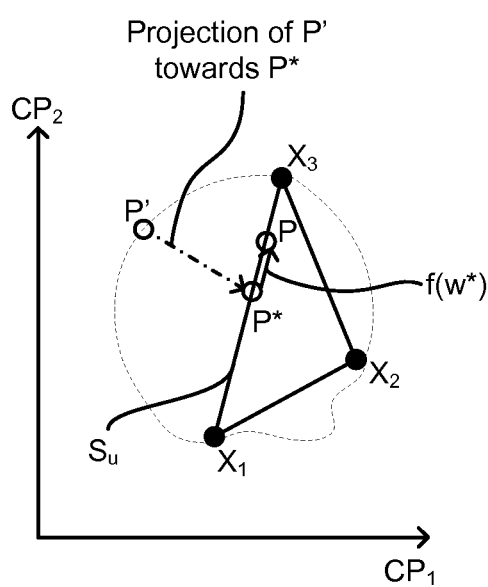
FIG. 15 schematically illustrates a control parameter space to help illustrate the method of FIG. 14.

Initial steps 1402, 1404, 1406 and 1408 of the method 1400 shall be described with reference to the example illustrated in FIG. 15. The example in FIG. 15 has a 2-dimensional control parameter space 800 and makes use of three reference points $X_1$, $X_2$ and $X_3$—however, it will be appreciated that FIG. 15 is provided purely for illustration purposes and that the method 1400 of FIG. 14 can be applied to other control parameter spaces 800 with different dimensions and with different numbers K of reference points.

At the step 1402, a test/example point P in the control parameter space 800 is chosen. The point P has a position vector p within the control parameter space 800. The step 1402 differs from the step 1202 of FIG. 12 in that, at the step 1402, the point P is chosen to lie on the edge/face/surface/perimeter/etc. (as appropriate depending on the nature of the polytope that is the current annotation defined by the reference points $X_1, X_2, \ldots, X_K$) that is "opposite" the point $X_u$. This edge/face/surface/perimeter/etc. shall be referred to in the following as the surface $S_u$, although it will be appreciated that the term "surface" may refer to an edge, face, cell, etc. of the polytope that is the annotation of interest, depending on the dimensionality K of the annotation. Thus the point P is chosen so that its barycentric coordinate $w=(w_1, w_2, \ldots, w_K)$ of the point P, with reference to the points $X_1, X_2, \ldots, X_K$ has $0 \leq w_i \leq 1$ for all $i=1, \ldots, K$ and $w_u=0$. The barycentric coordinate $w=(w_1, w_2, \ldots, w_K)$ of the point P, with reference to the points $X_1, X_2, \ldots, X_K$ is determined.

At the step 1404, the coefficients $w_i$ are used to form initial (test or example) blend weights $(\beta_1, \ldots, \beta_N) = \hat{g}(w_1, \ldots, w_K, X_1, \ldots, X_K)$ for the N predetermined animations. It will be appreciated that, for the $n^{th}$ animation of the N predetermined animations, the corresponding value of $\alpha_{i,n}$ may be 0 for all $i=1, \ldots, K$, in which case the value of $\beta_n$ need not be calculated, as the $n^{th}$ animation may be excluded from the blending that is to be performed based on the reference points $X_1, \ldots, X_K$. As the coefficient $w_u$ is zero, contribution $\alpha_{u,n}$ may also be ignored in the function g. It will be appreciated that other methods, or functions g, for determining initial test blend weights could be used.

The animation engine 600 is used to animate the virtual object 200 within the virtual world 202 by carrying out a blend using the test blend weights.

At the step 1406, the control parameters that correspond to the animation performed at the step 1404 are measured. For example, if the control parameters that define the control parameter space are the "speed" and "direction" of the virtual object 200 within the virtual world 202, then the speed and direction of the virtual object 200, when animated at the step 1404, are measured. These measured control parameters correspond to a point P' within the control parameter space 800. The point P' is projected back onto the surface $S_u$, via a linear projection i.e. the point P' is projected back onto the edge/face/surface/etc. from which the initial point P was chosen. The projected point is a point P* that has a position vector p* within the control parameter space 800. The barycentric coordinate w* of the point P*, with reference to the points $X_1, X_2, \ldots, X_K$, may be determined.

Linear projection of a point onto a surface of an annotation-region is a well-known geometric technique and shall not, therefore, be described in more detail herein. The point P' is projected towards the point $X_u$ and onto the surface $S_u$.

The vector (p−p*) defines a displacement, or a displacement vector, from the point P* to the point P. This displacement, or displacement vector, is along (or on) the surface $S_u$.

Thus, at the step 1408, for the barycentric coordinate w*, the value of the Type 2 displacement function $f_u$ is defined as $f_u(w^*)=(p-p^*)$. If the dimension M of the control parameter space is M=1, then $f_u(w^*)$ is a scalar value (which may be viewed as a vector of dimension 1); if the dimension M of the control parameter space is M>1, then $f_u(w^*)$ is a vector with M components.

The steps 1402, 1404, 1406 and 1408 are repeated in respect of one or more further points P. Thus, at a step 1410, it is determined whether there are one or more further points P that need to be processed—if there are one or more further points P that need to be processed, then processing returns to the step 1402 in relation to one of these further points P; otherwise, processing continues at a step 1412. Embodiments of the invention may, therefore, specify a predetermined number T of points $P_1, P_2, \ldots, P_T$ that are to be processed by the steps 1402, 1404, 1406 and 1408—this results in T respective barycentric coordinates $w^*_1, w^*_2, \ldots, w^*_T$ being calculated at the step 1406 and T corresponding values $f_u(w^*_1), f_u(w^*_2), \ldots, f_u(w^*_T)$ of the displacement function being set at the step 1408. The points $P_1, P_2, \ldots, P_T$ may be chosen at random along the surface $S_u$, or they may be distributed evenly along the surface $S_u$, or some other selection criteria may be used to select the points $P_1, P_2, \ldots, P_T$. The value of T may be chosen so as to try to achieve a desired level of accuracy in the displacement field that will be generated by the method 1400—the greater the value T, the more data is available (in terms of pairs of barycentric coordinates $w^*_i$ and corresponding values $f_u(w^*_i)$) to generate the displacement field.

The intention is that, given any point on the surface $S_u$, with barycentric coordinate w, a corresponding displacement $f_u(w)$ can be calculated. Thus, at the step 1412, the T respective barycentric coordinates $w^*_1, w^*_2, \ldots, w^*_T$ calculated at the step 1406 and their T corresponding values $f_u(w^*_1), f_u(w^*_2), \ldots, f_u(W^*_T)$ of the displacement function are used to determine the displacement function $f_u$ in general (which may be viewed as a displacement field or vector field) for the set of reference points $X_1, X_2, \ldots, X_K$. This may be performed in exactly the same way as at the step 1212, except that the $u^{th}$ component of the displacement is always set to be 0, i.e. $b_{i,u}$ is constrained to be 0 for i=1, . . . , T.

Thus, given a first point Q outside the annotation-region, that point Q may be projected (via linear projection) towards the reference point $X_u$ and onto the surface $S_u$. Methods of performing such linear projections are well-known and shall not be described in more detail herein. Let the projected point on the surface $S_u$ be the point $Q_u$. In essence, the displacement function $f_u$ takes in a barycentric coordinate w (corresponding to the point $Q_u$ with position vector $q_u$) relative to the set of predetermined points $X_1, \ldots, X_K$ and outputs a displacement d with the following property: if R is the point in the control parameter space 800 with position vector $q_u$+d having barycentric coordinate $(\tilde{w}_1, \ldots, \tilde{w}_K)$ relative to $X_1, \ldots, X_K$, and if the virtual object 200 is animated by blending the N predetermined animations using $(\beta_1, \ldots, \beta_N)=\hat{g}(\tilde{w}_1, \ldots, \tilde{w}_K, X_1, \ldots, X_K)$ as the set of blend weights for the N predetermined animations, then the resulting animation will have control parameters equal to (or at least substantially represented by) the projected point $Q_u$. Thus, using blend weights based on the coefficients of the barycentric coordinate of the point R provides a blended animation that tries to provide the initial intended set of control parameters specified by the initial point Q. Use of the point R in this manner results in a blended animation with control parameters closer to the initially desired control parameters (as represented by the point Q) than if the projected point $Q_u$ had been used without the displacement to derive the blend weights (i.e. than if the blend weights used were based on the coefficients of the barycentric coordinate for the point $Q_u$). Thus, the point R determined this way (and whose barycentric coordinate is used to determine the blend weights for animation blending) compensates for non-linearities introduced when blending the two or more animations—simply using the barycentric coordinate of $Q_u$ (which is the linear projection of the initial point Q onto the surface $S_u$) to determine the blend weights would not necessarily provide a blended animation that best corresponds to the target control parameters represented by the point Q, and such non-linearities or errors are compensated for, or corrected, by using the barycentric coordinate of the point R instead. The above description has provided some examples of how to derive such a displacement function, but it will be appreciated that other methods could be used instead.

It will be appreciated that, whilst the displacement function(s) for an annotation-region (for a plurality of annotations $X_1, \ldots, X_K$), be they Type 1 or Type 2, have been described as a function whose input parameter is a barycentric coordinate of a point P relative to those annotations $X_1, \ldots, X_K$ and whose output is a displacement. However, it will be appreciated that a displacement function could, instead, take a different form of input, e.g. an actual position vector of the point P in the control parameter space 800. Similarly, the displacement function could output the resultant displaced point (the point P*) in the above descriptions or, indeed, the barycentric coordinates of the displaced point. The skilled person could, therefore, implement the displacement function in a number of ways. It is only relevant that, given an initial point in the control parameter space (be that defined in terms of a barycentric coordinate, a position vector, etc.) a displacement function may be used to determine a further point in the control parameter space whose barycentric coordinate may be used as the basis for determining the blend weights.

The predetermined functions of embodiments of the invention thus implement non-linear barycentric interpolation when determining blend weights. In particular, given a point P in the control parameter space, one could simply use the coefficients $w_1, w_2, \ldots, w_K$ of its barycentric coordinate $w=(w_1, w_2, \ldots, w_K)$ relative the annotation points $X_1, \ldots, X_K$ of a selected annotation-region for the point P to determine the blend weights as $(\beta_1, \ldots, \beta_N)=\hat{g}(w_1, \ldots, w_K, X_1, \ldots, X_K)$—this would be linear barycentric interpolation. In contrast, the use of the displacement function results in a non-linear barycentric interpolation so as to obtain a point displaced from the point P and having barycentric coordinate $(\tilde{w}_1, \ldots, \tilde{w}_K)$ relative to $X_1, \ldots, X_K$—one then uses $(\beta_1, \ldots, \beta_N)=\hat{g}(\tilde{w}_1, \ldots, \tilde{w}_K, X_1, \ldots, X_K)$ as the set of blend weights for the N predetermined animations. For example, if a point P lies halfway along the line joining two annotations $X_1$ and $X_2$ that correspond to animations $A_1$ an $A_2$ (the points $X_1$ and $X_2$ having barycentric coordinates (1,0) and (0,1) respectively), then a linear interpolation would result in using 0.5 and 0.5 as the blend weights for the corresponding animations, as the barycentric coordinate of the point P relative to $X_1$ and $X_2$ is (0.5,0.5). In contrast, the use of the displacement function may result in using blend weights of, say, 0.46 and 0.54—i.e. non-linear barycentric interpolation is performed.

An annotation-region that has a corresponding Type 1 displacement function and one or more corresponding Type 2 displacement functions may be viewed as having a single displacement function that uses/applies the separate Type 1 and Type 2 displacement functions as appropriate depending on the location of the input point P relative to the annotation.

Figure 16:
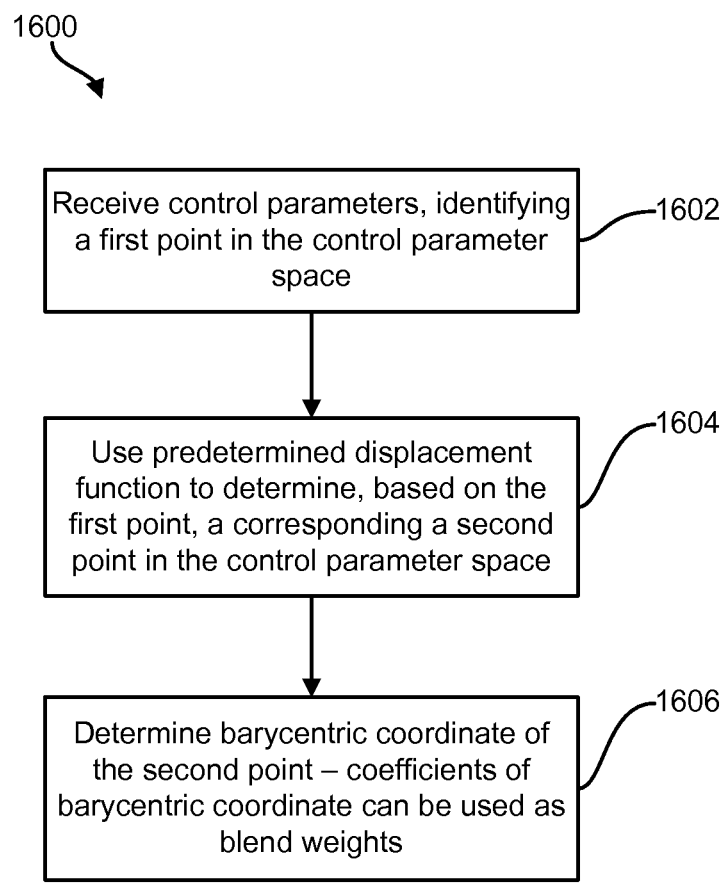
FIG. 16 is a flow chart illustrating a method according to an embodiment of the invention by which a weight generation module generates blend weights to be used, during runtime, for performing animation blending.

6—Animating Using the Mapping from the Control Parameter Space to the Blend Weight Space As discussed above, the displacement function f may be determined in an offline process prior to actually performing any desired animations, e.g. when compiling or building an animation engine 600 that is to be used in embodiments of the invention. FIG. 16 is a flow chart illustrating a method 1600 according to an embodiment of the invention by which the weight generation module 612 generates the blend weights to be used, during runtime, for performing animation blending, i.e. how the processing of the step 708 of FIG. 7 may be performed.

At a step 1602, the weight generation module 612 receives the control parameters 604. Thus, the weight generation module 612 receives an input identifying a first point P in the control parameter space 800. This point P has a position vector p in the control parameter space.

At a step 1604, the weight generation module 612 uses a predetermined displacement function to determine, based on the first point, a corresponding a second point in the control parameter space.

There may be a plurality of predetermined displacement functions available: for example (a) if there are a plurality of annotation-regions, then each annotation-region may have its own respective displacement function and (b) in some embodiments, Type 2 displacement functions may be used in addition to Type 1 displacement functions. Thus, the step 1604 may involve selecting one of the plurality of displacement functions to use.

If the point P lies inside an annotation-region, then that annotation-region is selected as the annotation-region "of interest", and the corresponding Type 1 displacement function for that particular annotation-region is selected. The second point may then be determined from the first point using that Type 1 displacement function. If the displacement function is arranged to receive, as its input parameter, a barycentric coordinate of a point and to output a displacement (as has been described above), then the step 1604 may involve: determining the barycentric coordinate of the first point P relative to the annotations $X_1, \ldots, X_K$ that define the selected annotation-region; using the predetermined displacement function to calculate a displacement; and setting the second point to be the first point displaced by that displacement. However, as mentioned above, the predetermined displacement function may be arranged to receive input or to provide outputs in different forms—however, in essence, the same second point will result as has been described above and the implementation (i.e. the interfaces) to the displacement function are not important.

If the point P lies outside all of the annotation-regions, then the annotation-region closest to the point P may be selected—methods of identifying the closest annotation-region will be well-known to the skilled person and shall not, therefore, be described in more detail herein. If the selected annotation-region is defined by corresponding annotations $X_1, \ldots, X_K$, then one of those annotations may be selected as a point $X_u$ towards which the point P should be projected. In particular, the barycentric coordinate $w = (w_1, w_2, \ldots, w_K)$ of the point P relative to the annotations $X_1, \ldots, X_K$ may be determined—if a coefficient $w_u$ is negative, then the corresponding annotation $X_u$ may be selected as the annotation towards which the point P should be projected. The Type 2 displacement function $f_u$ corresponding to the point $X_u$ may then be selected as the predetermined displacement function. The second point may then be determined from the first point using that Type 2 displacement function. If the displacement function is arranged to receive, as its input parameter, a barycentric coordinate of a point and to output a displacement (as has been described above), then the step 1604 may involve: projecting the first point P (linearly towards the point $X_u$) to arrive at a point $P_u$ on the surface $S_u$ corresponding to the annotation $X_u$; determining the barycentric coordinate of the point $P_u$ relative to the annotations $X_1, \ldots, X_K$ that define the selected annotation-region; using the predetermined displacement function to calculate a displacement; and setting the second point to be the point $P_u$ displaced by that displacement. However, as mentioned above, the predetermined displacement function may be arranged to receive input or to provide outputs in different forms—however, in essence, the same second point will result as has been described above and the implementation (i.e. the interfaces) to the displacement function are not important.

At a step 1606, the weight generation module 612 determines a barycentric coordinate w of the second point relative to the annotations $X_1, \ldots, X_K$ for the annotation selected for the first point. The blend weights to be used for the animation may then be based on this barycentric coordinate. For example, if $w = (w_1, w_2, \ldots, w_K)$, then the weight generation module 612 may generate the blend weights as $(\beta_1, \ldots, \beta_N) = \hat{g}(w_1, \ldots, w_K, X_1, \ldots, X_K)$, where $\beta_n$ is the blend weight for the $n^{th}$ predetermined animation. It will, however, be appreciated that the blend weights ultimately used may be some other function of the coefficients of the second barycentric coordinate (e.g. the blending module 616 may perform some filtering or preprocessing on these coefficients before it actually uses them as blend weights).

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may together be implemented by a single module.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program," as used herein, may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method of generating a target animation of a virtual object, the target animation comprising a blend of two or more animations from a plurality of predetermined animations, the blend comprising a weighted combination of the two or more animations based on respective blend weights for the two or more animations, the method comprising:

receiving an input identifying a first point, specifying the target animation, in a control parameter space, the control parameter space comprising one or more predetermined groupings of predetermined points, wherein each predetermined grouping corresponds to a respective portion of the control parameter space and each predetermined point corresponds either to a respective one of the two or more animations or a respective blend of the two or more animations, wherein there are one or more predetermined properties for animations of the virtual object and wherein each predetermined point further defines a corresponding value for at least one of the predetermined properties;

determining that the first point is situated outside of the respective portions of the control parameter space;

identifying a particular predetermined grouping that corresponds to a portion closest to the first point;

identifying the two or more animations via one or more predetermined points, in the particular predetermined grouping, that correspond to the two or more animations;

projecting the first point onto a surface of the portion closest to the first point;

identifying a projected point in the particular predetermined grouping that corresponds to the portion closest to the first point;

using a predetermined displacement function to determine, based on the projected point, a corresponding second point in the particular predetermined grouping that corresponds to the portion closest to the first point; and determining a barycentric coordinate for the second point, the barycentric coordinate being defined relative to one or more of the predetermined points in the control parameter space, wherein the blend weights for the two or more animations are based on the barycentric coordinate for the second point.

2. The method of claim 1, comprising:
determining a barycentric coordinate for the first point, the first barycentric coordinate being defined relative to the predetermined points in the control parameter space;
wherein said predetermined displacement function determines the second point using the barycentric coordinate of the first point.

3. The method of claim 1, wherein the displacement function corresponds to one of: a displacement field and a vector field.

4. The method of claim 1, wherein the predetermined displacement function comprises receiving data identifying the first point and to generate output comprising a displacement corresponding to the first point, wherein said second point is the first point displaced by the displacement.

5. The method of claim 1, wherein the predetermined function is used to generate an animation of the virtual object according to the blend weights for the two or more animations that are based on the barycentric coordinate of the second point defined relative to the predetermined points that is substantially the same as the first point.

6. The method of claim 5, wherein generating the animation further comprises:
using blend weights for the two or more animations that are based on a barycentric coordinate of the first point defined relative to predetermined points substantially different from the first point.

7. The method of claim 1, further comprising:
blending the two or more animations according to respective blend weights based on a barycentric coordinate of a given predetermined point in the control parameter space, and wherein the second point compensates for non-linearities introduced by the blending.

8. The method of claim 1, wherein projecting the first point onto the surface of the portion closet to the first point comprises:
linearly projecting the first point towards one of the predetermined points in the particular predetermined grouping that corresponds to the portion closest to the first point.

9. The method of claim 8, wherein:
for each predetermined grouping there are one or more corresponding predetermined displacement functions; and
the displacement function used to determine the second point is a predetermined displacement function associated with the particular predetermined grouping that corresponds to the portion closest to the first point.

10. The method of claim 9, wherein the displacement function used to determine the second point is selected based on a predetermined point, included in the particular predetermined grouping, towards which the first point is projected.

11. A computer system, comprising:
a processor;
a memory device holding at least one instruction set executable on the processor to cause the computer system to perform operations for generating a target animation of a virtual object, the target animation comprising a blend of two or more animations from a plurality of predetermined animations, the blend comprising a weighted combination of the two or more animations based on respective blend weights for the two or more animations, the operations comprising:
receiving an input identifying a first point, specifying the target animation, in a control parameter space, the control parameter space comprising one or more predetermined groupings of predetermined points, wherein each predetermined grouping corresponds to a respective portion of the control parameter space and each predetermined point corresponds either to a respective one of the two or more animations or a respective blend of the two or more animations, wherein there are one or more predetermined properties for animations of the virtual object and wherein each predetermined point further defines a corresponding value for at least one of the predetermined properties;
determining that the first point is situated outside of the respective portions of the control parameter space;
identifying a particular predetermined grouping that corresponds to a portion closest to the first point;
identifying the two or more animations via one or more predetermined points, in the particular predetermined grouping, that correspond to the two or more animations;
projecting the first point onto a surface of the portion closest to the first point;
identifying a projected point in the particular predetermined grouping that corresponds to the portion closest to the first point;
using a predetermined displacement function to determine, based on the projected point, a corresponding second point in the particular predetermined grouping that corresponds to the portion closest to the first point; and
determining a barycentric coordinate for the second point, the barycentric coordinate being defined relative to one or more of the predetermined points in the control parameter space, wherein the blend weights for the two or more animations are based on the barycentric coordinate for the second point.

12. The computer system of claim 11, the operations comprising:
    determining a barycentric coordinate for the first point, the first barycentric coordinate being defined relative to the predetermined points in the control parameter space;
    wherein said predetermined displacement function determines the second point using the barycentric coordinate of the first point.

13. The computer system of claim 11, wherein the displacement function corresponds to one of: a displacement field and a vector field.

14. The computer system of claim 11, wherein the predetermined displacement function comprises at least one operation for receiving data identifying the first point and to generate output comprising a displacement corresponding to the first point, wherein said second point is the first point displaced by the displacement.

15. The computer system of claim 11, wherein the predetermined function comprises at least one operation used to generate an animation of the virtual object according to the blend weights for the two or more animations that are based on the barycentric coordinate of the second point defined relative to the predetermined points that is substantially the same as the first point.

16. The computer system of claim 15, wherein generating the animation further comprises at least one operation for:
    using blend weights for the two or more animations that are based on a barycentric coordinate of the first point defined relative to predetermined points substantially different from the first point.

17. The computer system of claim 11, the operations further comprising:
    blending the two or more animations according to respective blend weights based on a barycentric coordinate of a given predetermined point in the control parameter space, and wherein the second point compensates for non-linearities introduced by the blending.

18. The computer system of claim 11, wherein projecting the first point onto the surface of the portion closest to the first point comprises at least one operation for:
    linearly projecting the first point towards one of the predetermined points in the particular predetermined grouping that corresponds to the portion closest to the first point.

19. The computer system of claim 18, wherein:
    for each predetermined grouping there are one or more corresponding predetermined displacement functions; and
    the displacement function used to determine the second point is a predetermined displacement function associated with the particular predetermined grouping that corresponds to the portion closest to the first point.

20. The computer system of claim 19, wherein the displacement function used to determine the second point is selected based on a predetermined point, included in the particular predetermined grouping, towards which the first point is projected.

21. A non-transitory computer-readable medium storing executable instructions thereon, which, when executed by a processor, cause the processor to perform operations for generating a target animation of a virtual object, the target animation comprising a blend of two or more animations from a plurality of predetermined animations, the blend comprising a weighted combination of the two or more animations based on respective blend weights for the two or more animations, the operations including:
    receiving an input identifying a first point, specifying the target animation, in a control parameter space, the control parameter space comprising one or more predetermined groupings of predetermined points, wherein each predetermined grouping corresponds to a respective portion of the control parameter space and each predetermined point corresponds either to a respective one of the two or more animations or a respective blend of the two or more animations, wherein there are one or more predetermined properties for animations of the virtual object and wherein each predetermined point further defines a corresponding value for at least one of the predetermined properties;
    determining that the first point is situated outside of the respective portions of the control parameter space;
    identifying a particular predetermined grouping that corresponds to a portion closest to the first point;
    identifying the two or more animations via one or more predetermined points, in the particular predetermined grouping, that correspond to the two or more animations;
    projecting the first point onto a surface of the portion closest to the first point;
    identifying a projected point in the particular predetermined grouping that corresponds to the portion closest to the first point;
    using a predetermined displacement function to determine, based on the projected point, a corresponding second point in the particular predetermined grouping that corresponds to the portion closest to the first point; and
    determining a barycentric coordinate for the second point, the barycentric coordinate being defined relative to one or more of the predetermined points in the control parameter space, wherein the blend weights for the two or more animations are based on the barycentric coordinate for the second point.

22. The computer-readable medium of claim 21, the operations comprising:
    determining a barycentric coordinate for the first point, the first barycentric coordinate being defined relative to the predetermined points in the control parameter space;
    wherein said predetermined displacement function determines the second point using the barycentric coordinate of the first point.

23. The computer-readable medium of claim 21, wherein the displacement function corresponds to one of: a displacement field and a vector field.

24. The computer-readable medium of claim 21, wherein the predetermined displacement function comprises at least one operation for receiving data identifying the first point and to generate output comprising a displacement corresponding to the first point, wherein said second point is the first point displaced by the displacement.

25. The computer-readable medium of claim 21, wherein the predetermined function comprises at least one operation used to generate an animation of the virtual object according to the blend weights for the two or more animations that are based on the barycentric coordinate of the second point defined relative to the predetermined points that is substantially the same as the first point.

26. The computer-readable medium of claim 25, wherein generating the animation further comprises at least one operation for:

using blend weights for the two or more animations that are based on a barycentric coordinate of the first point defined relative to predetermined points substantially different from the first point.

27. The computer-readable medium of claim 21, the operations further comprising:
blending the two or more animations according to respective blend weights based on a barycentric coordinate of a given predetermined point in the control parameter space, and wherein the second point compensates for non-linearities introduced by the blending.

28. The computer-readable medium of claim 21, wherein projecting the first point onto the surface of the portion closest to the first point comprises at least one operation for:
linearly projecting the first point towards one of the predetermined points in the particular predetermined grouping that corresponds to the portion closest to the first point.

29. The computer-readable medium of claim 28, wherein:
for each predetermined grouping there are one or more corresponding predetermined displacement functions; and
the displacement function used to determine the second point is a predetermined displacement function associated with the particular predetermined grouping that corresponds to the portion closest to the first point.

30. The computer-readable medium of claim 29, wherein the displacement function used to determine the second point is selected based on a predetermined point, included in the particular predetermined grouping, towards which the first point is projected.

* * * * *

UNITED STATES PATENT AND TRADEMARK OFFICE
CERTIFICATE OF CORRECTION

PATENT NO. : 9,652,879 B2
APPLICATION NO. : 14/224407
DATED : May 16, 2017
INVENTOR(S) : Alberto Aguado It is certified that error appears in the above-identified patent and that said Letters Patent is hereby corrected as shown below:

On the Title Page

In item (73), in "Assignee", in Column 1, Line 1, delete "Ltd.," and insert --Limited,--, therefor In item (65), in "Prior Publication Data", in Column 1, Line 1, after "2014", insert
--¶(30) Foreign Application Priority Data
Mar. 25, 2013 (GB) ............ 1305384.8--

In the Specification

In Column 2, Line 2, delete "animation the" and insert --animation-the-- therefor In Column 7, Line 50, delete "interest for" and insert --interest-for-- therefor In Column 7, Line 51-52, delete "correspond-to" and insert --correspond to-- therefor In Column 15, Line 36, delete "900-6}forms" and insert --900-6} forms-- therefor In Column 15, Line 38, delete "900-6}forms" and insert --900-6} forms-- therefor In Column 15, Line 40, delete "900-5}forms" and insert --900-5} forms-- therefor In Column 17, Line 10-14, delete " $p = \frac{w_1}{\sum_{i=1}^{K} w_i} v_1 + \frac{w_2}{\sum_{i=1}^{K} w_i} v_2 + \ldots + \frac{w_K}{\sum_{i=1}^{K} w_i} v_K$ " and insert -- $\sum_{i=1}^{K} w_i = 1$, --
therefor In Column 20, Line 30, delete "(1≤x≤y≤K)." and insert --(1≤x<y≤K).-- therefor Signed and Sealed this
Eighth Day of May, 2018

Andrei Iancu
*Director of the United States Patent and Trademark Office*

CERTIFICATE OF CORRECTION (continued)
U.S. Pat. No. 9,652,879 B2

In Column 20, Line 32, delete "($1 \leq x \leq y \leq K$)" and insert --($1 \leq x < y \leq K$)-- therefor In Column 22, Line 41, delete "g" and insert --$\hat{g}$-- therefor In Column 22, Line 43, delete "g" and insert --$\hat{g}$-- therefor In Column 24, Line 47, delete "$f_u(w^*_i)$," and insert --$f_u(w^*_1)$,-- therefor In Column 24, Line 63, delete "$f_u(W^*_T)$" and insert --$f_u(w^*_T)$-- therefor In the Claims In Column 30, Line 2, in Claim 8, delete "closet" and insert --closest-- therefor In Column 31, Line 40, in Claim 17, delete "non- linearities" and insert --non-linearities-- therefor In Column 33, Line 11, in Claim 27, delete "non- linearities" and insert --non-linearities-- therefor